United States Patent
Bronikowski et al.

(10) Patent No.: US 12,174,628 B2
(45) Date of Patent: Dec. 24, 2024

(54) SYSTEM AND METHOD FOR CONTROLLING A SELF-GUIDED VEHICLE

(71) Applicant: Purdue Research Foundation, West Lafayette, IN (US)

(72) Inventors: Scott Alan Bronikowski, South Milwaukee, WI (US); Daniel Paul Barrett, South Bend, IN (US); Haonan Yu, Sunnyvale, CA (US); Jeffrey Mark Siskind, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 542 days.

(21) Appl. No.: 16/328,202

(22) PCT Filed: Aug. 25, 2017

(86) PCT No.: PCT/US2017/048750
§ 371 (c)(1),
(2) Date: Feb. 25, 2019

(87) PCT Pub. No.: WO2018/039644
PCT Pub. Date: Mar. 1, 2018

(65) Prior Publication Data
US 2019/0179316 A1   Jun. 13, 2019

Related U.S. Application Data

(60) Provisional application No. 62/379,245, filed on Aug. 25, 2016.

(51) Int. Cl.
*G05D 1/00* (2024.01)
*B60W 30/10* (2006.01)
(Continued)

(52) U.S. Cl.
CPC .......... *G05D 1/0033* (2013.01); *B60W 30/10* (2013.01); *B60W 50/08* (2013.01); *B60W 50/10* (2013.01);
(Continued)

(58) Field of Classification Search
CPC .... G10L 15/00; G05D 1/0088; G05D 1/0221; G05D 1/0231; G05D 1/10; B60W 50/08;
(Continued)

(56) References Cited

U.S. PATENT DOCUMENTS 6,523,061 B1 * 2/2003 Halverson ........... H04M 3/4936
707/E17.139
6,567,778 B1 * 5/2003 Chao Chang ......... G06F 40/295
704/275

(Continued)

FOREIGN PATENT DOCUMENTS

WO   WO-2010141904 A1 * 12/2010   ......... G01C 21/3608
WO   2016130719 A2    8/2016

OTHER PUBLICATIONS

Dale, Robert et al., Using Natural Language Generation in Automatic Route Description, Journal of Research and Practice in Information Technology, vol. 37, No. 1, Feb. 2005, pp. 89-105.
(Continued)

*Primary Examiner* — Anthony R Jimenez
(74) *Attorney, Agent, or Firm* — Purdue Research Foundation

(57) ABSTRACT

A system for directing the motion of a vehicle, comprising receiving commands in natural language using a processor, the commands specifying a relative path to be taken by the vehicle with respect to other objects in the environment; and determining an absolute path for the vehicle to follow based on the relative path using the processor, the absolute path comprising a series of coordinates in the environment; and
(Continued)

directing the vehicle along the absolute path. Also provided is a system for training a lexicon of a natural language processing system, comprising receiving a data set containing a corpus of absolute paths driven by a vehicle annotated with natural language descriptions of the absolute paths using a processor, and determining parameters of the lexicon based on the data set.

19 Claims, 20 Drawing Sheets

(51) Int. Cl.
    *B60W 50/08*     (2020.01)
    *B60W 50/10*     (2012.01)
    *G05D 1/02*     (2020.01)
    *G05D 1/10*     (2006.01)

(52) U.S. Cl.
    CPC ......... *G05D 1/0088* (2013.01); *G05D 1/0221* (2013.01); *G05D 1/0231* (2013.01); *G05D 1/10* (2013.01)

(58) Field of Classification Search
    CPC ............. B60W 50/10; B60W 2550/00; B60W 2550/20; B60W 2550/40; B60W 2550/402; B60W 2550/406; B60W 30/10; G01C 21/00; G01C 21/005; G01C 21/025; G01C 21/06; G01C 21/10; G01C 21/12; G01C 21/16; G01C 21/26; G01C 21/30; G01C 21/32; G01C 21/34; G01C 21/36; G01C 21/3602; G01C 21/3608; G01C 21/362
    USPC .......................................................... 701/23
    See application file for complete search history.

(56) References Cited

U.S. PATENT DOCUMENTS

| | | | |
|---|---|---|---|
| 8,060,271 | B2 | 11/2011 | Dolgov et al. |
| 9,435,652 | B2* | 9/2016 | Ralston ................ G08G 1/0145 |
| 10,025,778 | B2* | 7/2018 | Gao ....................... G06F 40/44 |
| 2004/0056797 | A1 | 3/2004 | Knockeart et al. |
| 2006/0271258 | A1 | 11/2006 | Salmeen et al. |
| 2014/0136187 | A1 | 5/2014 | Wolverton et al. |
| 2014/0244259 | A1 | 8/2014 | Rosario et al. |
| 2016/0070265 | A1* | 3/2016 | Liu ....................... G05D 1/0088 701/3 |
| 2017/0292843 | A1* | 10/2017 | Wei .................... G01C 21/3453 |

OTHER PUBLICATIONS

European Examination Report issued by the European Patent Office, Munich, Germany, dated May 21, 2021, for European Patent Application No. 17844544.1; 11 pages.
Reply to European Examination Report dated May 21, 2021, submitted to the European Patent Office, Munich, Germany, on Aug. 16, 2021, for European Patent Application 17844544.1; 28 pages.
European Examination Report issued by the European Patent Office, Munich, Germany, dated Feb. 4, 2022, for European Patent Application No. 17844544.1; 7 pages.
Reply to European Examination Report dated Feb. 4, 2022, submitted to the European Patent Office, Munich, Germany, on Jun. 9, 2022, for European Patent Application 17844544.1; 82 pages.
Communication pursuant to Rules 70(2) and 70a(2) issued by the European Patent Office, Munich, Germany, dated Jul. 3, 2020, for European Patent Applicaiton No. 17844544.1; 1 page.
Reply to Communication pursuant to Rules 70(2) and 70a(2) dated Feb. 4, 2022, submitted to the European Patent Office, Munich, Germany, on Dec. 10, 2020, for European Patent Application 17844544.1; 45 pages.

MacMahon, M. et al., "Walk the Talk: Connecting Language, Knowledge, and Action in Route Instructions," in Proceedings of the 21st National Conference on Artificial Intelligence (AAAI '06), 2006.
Kollar, T. et al., "Toward Understanding Natural Language Directions," in International Conference on Human- Robot Interaction, IEEE, 2010, pp. 259-266.
Matuszek, C. et al., "Following Directions Using Statistical Machine Translation," in Proceedings of the 5th ACM/IEEE International Conference on Human-Robot Interaction, IEEE, 2010, pp. 251-258.
Tellex, S. et al., "Understanding Natural Language Commands for Robotic Navigation and Mobile Manipulation," in Proceedings of the 25th AAAI Conference on Artificial Intelligence, 2011, pp. 1507-1514.
Chen, D.L. et al., "Learning to Interpret Natural Language Navigation Instructions From Observations," in Proceedings of the 25th AAAI Conference on Artificial Intelligence, 2011, pp. 859-865.
Matuszek, C. et al., "Learning to Parse Natural Language Commands to a Robot Control System," in the 13th International Symposium on Experimental Robotics (Experimental Robotics, Desai, J. P. et al.), 2012, pp. 403-415.
Artzi, Y. et al., "Weakly Supervised Learning of Semantic Parsers for Mappinglinstructions to Actions," Transactions of the Association for Computational Linguistics, vol. 1, No. 1, pp. 49-62, 2013.
Tellex, S. et al., "Learning perceptually grounded word meanings from unaligned parallel data," Machine Learning, 2014, 94:151-167 (available online May 18, 2013).
Dobnik, S. et al., "Teaching a robot spatial expressions," in Proceedings Second ACL-SIGSEM Workshop on the Linguistic Dimensions of Prepositions and their Use in Computational Linguistics Formalisms and Applications, Essex University, 2005.
Lauria, S. et al., "Mobile robot programming using natural language," Robotics and Autonomous Systems, vol. 38, No. 3, pp. 171-181, 2002.
Teller, S. et al., "A Voice-Commandable Robotic Forklift Working Alongside Humans in Minimally-Prepared Outdoor Environments," in IEEE International Conference on Robotics and Automation, 2010, pp. 526-533.
Koller, A. et al., "Report on the Second NLG Challenge on Generating Instructions in Virtual Environments (GIVE-2)," in Proceedings of the 6th International Natural Language Generation Conference, INLG '10, 2010, pp. 243-250.
Harris, T. K. et al., "Heterogeneous Multi-Robot Dialogues for Search Tasks," in 2005 AAAI Spring Symposium, (2004).
Marge, M. R. et al., "Exploring Spoken Dialog Interaction in Human-Robot Teams," in Robots, Games, and Research: Success Stories in USARSim, IROS Workshop, 2009.
Pappu, A. et al., "The Structure and Generality of Spoken Route Instructions," in Proceedings of the 13th Annual Meeting of the Special Interest Group on Discourse and Dialogue (SIGDIAL), 2012, pp. 99-107.
Fasola, J. et al., "Using Semantic Fields to Model Dynamic Spatial Relations in a Robot Architectur for Natural Language Instruction of Service Robots," in IEEE/RSJ International Conference on Intelligent Robots and Systems (IROS), 2013, pp. 143-150.
McGuire, P. et al., "Multi-Modal Machine Communication for Instructing Robot Grasping Tasks," in Proceedings of the IEEE/RSJ International Conference on Intelligent Robots and Systems (IROS), vol. 2, 2002, pp. 1082-1088.
Doshi, F. et al., "Spoken language interaction with model uncertainty: an adaptive human-robot interaction system," Connection Science, vol. 20, No. 4, pp. 299-318, 2008.
Matuszek, C. et al., "A Joint Model of Language and Perception for Grounded Attribute Learning," in Proceedings of the 29th International Conference on Machine Learning, 2012, pp. 1671-1678.
She, L. et al., "Back to the Blocks World: Learning New Actions Through Situated Human-Robot Dialogue," in the Proceedings of the 15th Annual Meeting of the Special Interest Group on Discourse and Dialogue (SIGDIAL), 2014, pp. 89-97.
Friedman, S. et al., "Voronoi Random Fields: Extracting Topological Structure of Indoor Environments via Place Labeling." in International Joint Conference on Artificial Intelligence (IJCAI-07), vol. 7, 2007, pp. 2109-2114.

(56) References Cited

OTHER PUBLICATIONS

Hetherington, I. L. et al., "Pocketsummit: Small-Footprint Continuous Speech Recognition." in Annual Conference of the International Speech Communication Association (INTERSPEECH 2007), vol. 11, 2007, pp. 13-51.

Chen, D. et al., "A Fast and Accurate Dependency Parser using Neural Networks," in Proceedings of the 2014 Conference on Empirical Methods on Natural Language Processing (EMNLP), 2014, pp. 740-750.

Baum, L. E. et al., "Statistical Inference for Probabilistic Functions of Finite State Markov Chains," The Annals of Mathematical Statistics, vol. 37, No. 6, pp. 1554-1563, 1966.

Baum, L. E. et al., "A maximization technique occuring in the statistical analysis of probabilistic functions of Markov chains," The Annals of Mathematical Statistics, vol. 41, No. 1, pp. 164-171, 1970.

Baum, L. E., "An Inequality and Associated Maximization Technique in Statistical Estimation for Probabilistic Functions of a Markov Process," Inequalities, vol. 3, pp. 1-8, 1972.

Dale, R. et al., "Computational Interpretations of the Gricean Maxims in the Generation Referring Expressions," Cognitive Science, vol. 18, No. 2, pp. 233-263, 1995.

Griewank, A., "On Automatic Differentiation," in Mathematical Programming: Recent Developments and Applications, M. Iri and K. Tanabe, Eds. Kluwer Academic, 1989, (CRPC-TR89003 / 1989), pp. 83-108.

Blaschko, M. et al., "Simultaneous Object Detection and Ranking with Weak Supervision," in Advances in Neural Information Processing Systems 23 (NIPS), 2010, pp. 235-243.

Lee, Y. J. et al., "Learning the Easy Things First: Self-Paced Visual Category Discovery," in CVPR, 2011, Conference Paper IEEE, pp. 1721-1728.

Rubinstein, M. et al., "Unsupervised Joint Object Discovery and Segmentation in Internet Images," in CVPR, 2013, pp. 1939-1946.

Tang, K. et al., "Co-localization in Real-World Images," in CVPR, 2014, pp. 1464-1471.

Prest, A. et al., "Learning Object Class Detectors from Weakly Annotated Video" in CVPR, 2012, pp. 3282-3289; 978-1-4673-1228-8/12 2012 IEEE.

Schulter, S. et al., "Unsupervised Object Discovery and Segmentation in Videos," in Proceedings of the British Machine Vision Conference, 2013, pp. 53.1-53.12.

Joulin, A. et al., "Efficient Image and Video Co-localization with Frank-Wolfe Algorithm," in D. Fleet et al. (Eds): ECCV, 2014, Part VI, LNCS 8694, pp. 253-268.

Srikantha, A. et al., "Discovering Object Classes from Activities," in D. Fleet et al. (Eds.): ECCV, 2014, Part VI, LNCS 8694, pp. 415-430.

Arbelaez, P. et al., "Multiscale Combinatorial Grouping," in CVPR, 2014, pp. 328-335.

Bosch, A. et al., "Image Classification Using Random Forests and Ferns," in 2007 IEEE 11th International Conference on Computer Vision, 978-1-4244-1631-8/07 2007 IEEE.

Vedaldi, A. et al., "VLFeat: An Open and Portable Library of Computer Vision Algorithms," in Proceedings of the International Conference on Multimedia (MM'10), 2010, pp. 1469-1472.

Gall, J. et al., "Class-Specific Hough Forests for Object Detection," in CVPR, 2009 IEEE Conference on Computer Vision and Pattern Recognition, 2009, pp. 1022-1029.

Barrett, D. P. et al., "Robot Language Learning, Generation, and Comprehension," arXiv, 1508.06161 [cs.RO], arXiv.org, 2015.

Hartley, R. et al., Multiple View Geometry in Computer Vision. 2nd Edition, Cambridge University Press, 2000.

Pearl, J., "Reverend Bayes on Inference Engines: A Distributed Hierarchical Approach," AAAI-82 Proceedings, 1982, pp. 133-136.

Andres, B. et al., "OpenGM: A C++ Library for Discrete Graphical Models," arXiv.org, vol. abs/1206.0111v1, 2012, pp. 1-5.

Land, A. H. et al., "An Automatic Method of Solving Discrete Programming Problems," Econometrica: Journal of the Econometric Society, vol. 28, No. 3, pp. 497-520, Jul. 1960.

International Search Report and Written Opinion, issued by the ISA/US, Commissioner for Patents, mailed Dec. 26, 2017, for International Application No. PCT/US2017/048750.

International Preliminary Report on Patentability, The International Bureau of WIPO, dated Feb. 26, 2019, for International Application No. PCT/US2017/048750.

Partial Supplementary European Search Report, issued by the European Patent Office, Munich, Germany, dated Dec. 20, 2019, for European Patent Application No. 17844544.1; 14 pages.

Extended European Search Report, issued by the European Patent Office, Munich, Germany, dated Jun. 16, 2020, for European Patent Application No. 17844544.1; 15 pages.

Kollar, Thomas, Learning to Understand Spatial Lanuage for Robotic Navigation and Mobile Manipulation, Massachusetts Institute of Technology, Jun. 2011, pp. 1-108, XP055804225.

* cited by examiner

SYSTEM AND METHOD FOR CONTROLLING A SELF-GUIDED VEHICLE

CROSS-REFERENCE TO RELATED APPLICATIONS

The present patent application is a 35 U.S.C. § 371 national phase application of PCT/US2017/048750, filed Aug. 25, 2017, which is related to and claims the priority benefit of U.S. Provisional Patent Application Ser. No. 62/379,245, filed Aug. 25, 2016, the contents of which is hereby incorporated by reference in its entirety into the present disclosure.

STATEMENT REGARDING GOVERNMENT FUNDING

This invention was made with government support under W911NF-10-2-0060 awarded by the Army Research Laboratory and under 1522954-IIS awarded by the National Science Foundation. The government has certain rights in the invention.

TECHNICAL FIELD

The present application relates to vehicle control systems, and more specifically, to a system and method for controlling a self-guided vehicle.

BACKGROUND

With recent advances in machine perception and robotic automation, it becomes increasingly important to allow machines to interact with humans using natural language in a grounded fashion, where the language refers to actual things and activities in the world. While there are known systems which learn the meanings of words in the context of description of navigation paths, these systems operate only within discrete simulation, as they utilize the internal representation of the simulation to obtain discrete symbolic primitives. They have a small space of possible robot actions, positions, and states which are represented in terms of symbolic primitives such as TURN LEFT, TURN RIGHT, and MOVE FORWARD N STEPS, or DRIVE TO LOCATION 1 and PICK UP PALLET 1. Thus, they take a sequence of primitives like {DRIVE TO LOCATION 1; PICK UP PALLET 1} and a sentence like go to the pallet and pick it up and learn that the word pallet maps to the primitive PALLET, that the phrase pick up maps to the primitive PICK UP, and that the phrase go to X means DRIVE TO LOCATION X. These systems cannot operate in the continuous physical world and where an infinite number of configurations are possible. Therefore, improvements are needed in the field.

SUMMARY

According to one aspect, the present disclosure provides method for directing the motion of a vehicle, comprising receiving commands in natural language using a processor, the commands specifying a relative path to be taken by the vehicle with respect to other objects in the environment, determining an absolute path for the vehicle to follow based on the relative path using the processor, the absolute path comprising a series of coordinates in the environment, directing the vehicle along the absolute path.

According to another aspect, the present disclosure provides a method for training a lexicon of a natural language computer processing system, comprising receiving a data set containing a corpus of absolute paths driven by a vehicle annotated with natural language descriptions of said absolute paths using a processor, and automatically determining parameters of the lexicon based on the data set.

According to another aspect, the present disclosure provides a method for producing natural language descriptions of paths driven by a vehicle, comprising receiving a data set representing an absolute path driven by a vehicle using a processor, the absolute path comprising a series of coordinates in the environment, and automatically determining the natural language description of the absolute path using a predetermined lexicon of the environment using the processor.

According to another aspect, the present disclosure provides a system and method for directing a ground-based vehicle, such as an automobile or a self-propelled robot. The vehicle may also include a camera for capturing image data of the vehicle environment as the vehicle moves. The system therefore receives a video feed which contains a plurality of images of the environment taken from different points of view. Using images, video, odometry and/or inertial measurement unit (IMU) information received from the vehicle, the system detects objects in the environment and localizes the objects in a 3D coordinate system. The process contains three main steps, detection and localization, clustering, and labeling.

BRIEF DESCRIPTION OF THE DRAWINGS

In the following description and drawings, identical reference numerals have been used, where possible, to designate identical features that are common to the drawings.

Figure 1:
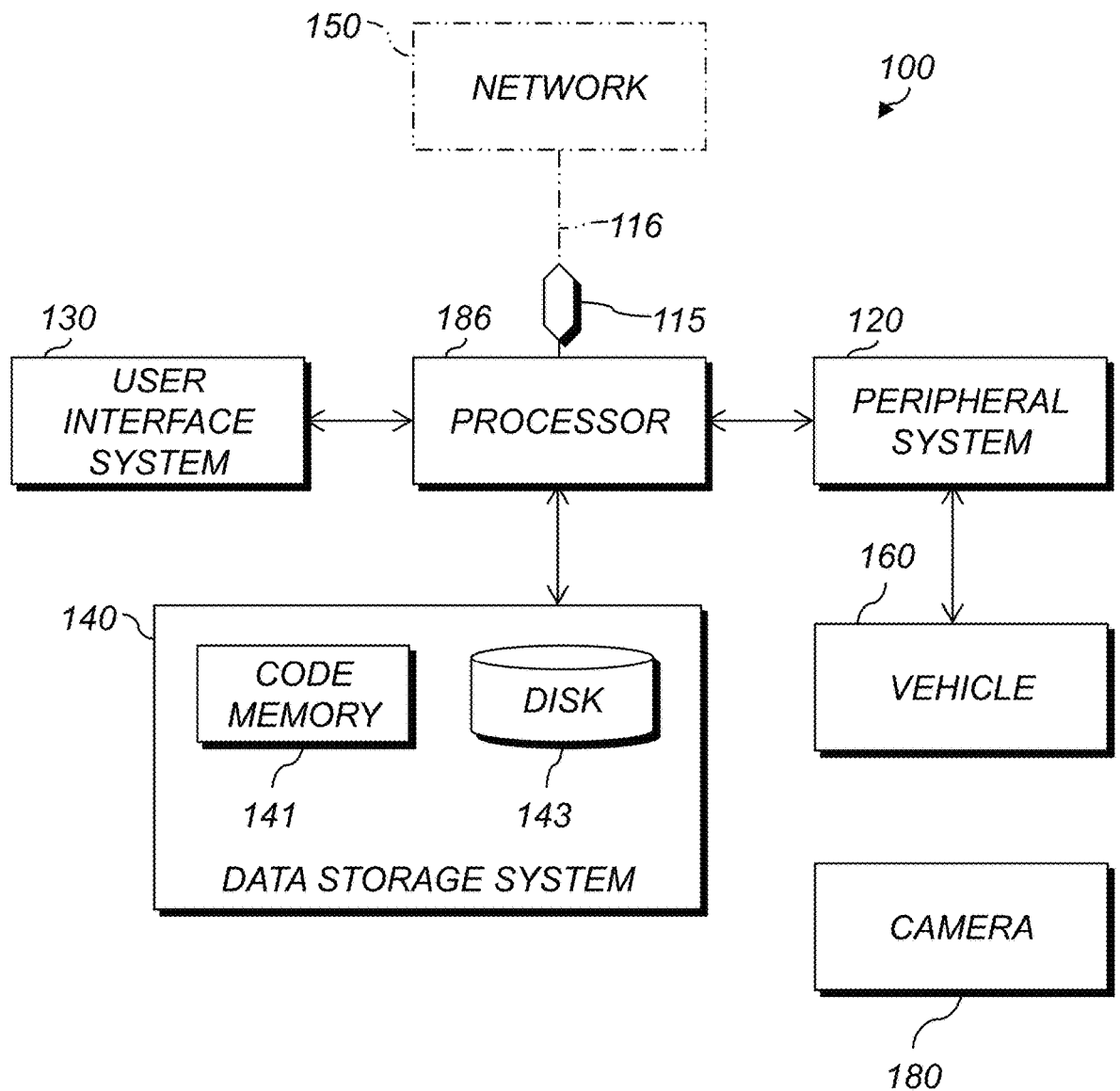
FIG. 1 is a diagram showing a vehicle control system for sensing, processing and displaying vehicle data according to various aspects.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

The present disclosure provides a system and method for controlling a self-guided vehicle which is being directed through natural language commands from a human operator. The system may also output natural language output based on the environment it is navigating, as described further below.

The presently disclosed system is able to represent the meaning of a sentence that describes a path driven by a robot through an environment containing a number of objects. An example of such a sentence is "The robot went toward the box which is left of the chair and behind the cone and then went in front of the stool." Such sentences are sequences of descriptions in terms of objects in the environment. Nouns in the descriptions indicate the class of the objects involved, such as box or chair.

However, the nouns do not specify exactly which object in the environment is being referenced, as, for example, there may be more than one "box" in the environment. This introduces the potential for ambiguity. Prepositions in the sentences, such as "in front of and left of", are used to describe the changing position of the robot over time (e.g., "the robot went in front of the stool"), as well as to describe the relative positions of the objects in the environment (e.g., "the box which is left of the chair"). As used herein, the former kind of usage is referred to as "adverbial" and the latter is referred to as "adjectival". Many prepositions, like "in front of," can have both adverbial usage, as in "the robot went in front of the chair", and adjectival usage, as in "the chair in front of the table." Both adverbial and adjectival usage may be nested to arbitrary depth, as in "toward the chair which is in front of the table which is right of the stool which is . . . " Both may also be combined with conjunctions to describe a single object in terms of several others, as in "the box which is left of the chair and behind the cone," or to describe the position of the robot at a particular point in time in terms of multiple objects, as in "went toward the chair and left of the table." The use of nesting and conjunction allows both rich description of the path of the robot and disambiguation of the specific objects used to describe the robot motion.

FIG. 1 is a high-level diagram showing the components of an exemplary vehicle control system 100 for analyzing vehicle data and performing other analyses described herein, and related components. The control system 100 includes a processor 186, a peripheral system 120, a user interface system 130, and a data storage system 140. The peripheral system 120, the user interface system 130 and the data storage system 140 are communicatively connected to the processor 186. Processor 186 can be communicatively connected to network 150 (shown in phantom), e.g., the Internet or a leased line, as discussed below. It shall be understood that the system 100 may include multiple processors 186 and other components shown in FIG. 1. The video content data, and other input and output data described herein may be obtained using network 150 (from one or more data sources), peripheral system 120 and/or displayed using display units (included in user interface system 130) which can each include one or more of systems 186, 120, 130, 140, and can each connect to one or more network(s) 150. Processor 186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

The peripheral system 120 can include one or more devices configured to provide information to the processor 186. For example, the peripheral system 120 can include a self-guided vehicle 160, such as a robot, ground-based vehicle, aerial vehicle, or sea-based vehicle. The vehicle 160 may include appropriate circuitry or computer processing systems which transmit and receive information regarding environment floorplans and/or the position and movement of the vehicle as it navigates through an environment. The peripheral system 120 may further include a digital camera 180 for transmitting images or video to the processor or to a display for viewing by a user. The processor 186, upon receipt of information from a device in the peripheral system 120, can store such information in the data storage system 140.

Figure 2:
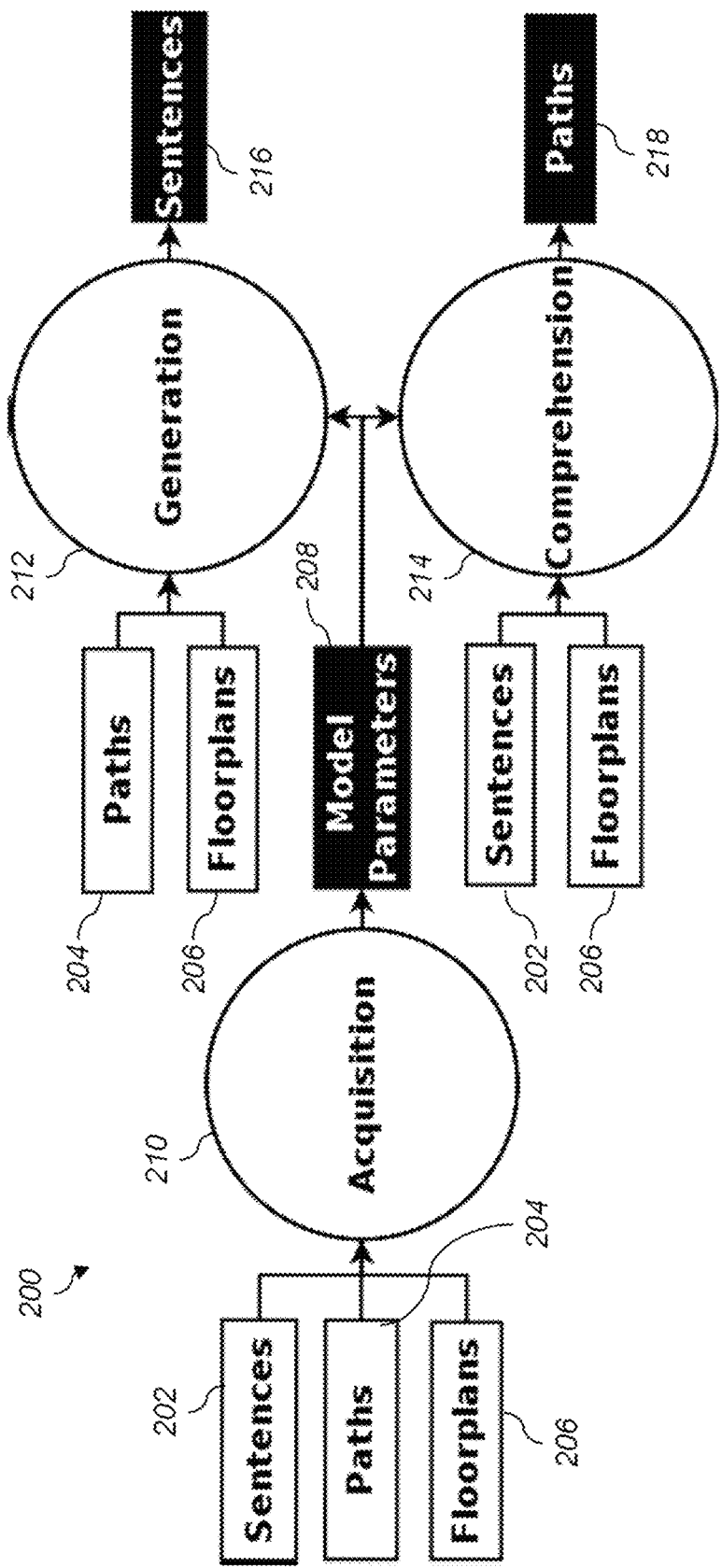
FIG. 2 is a data flow diagram for the vehicle control system of FIG. 1 according to various aspects.

FIG. 2 shows a data flow diagram 200 for the vehicle control system 100 according to one embodiment. In operation, the system 100 represents the meaning of an input sentence through a scoring function that takes as input (received by the processor 186 as verbal commands or electronically as digital instructions) one or more sentences 202, a vehicle path 204, a floorplan 206 that specifies the locations of objects in the vehicle's environment, and a set of parameters 208 defining the meaning of words, and returns a high score when the sentence is true of the path in the given environment. This method allows a single unified representation of word and sentence meaning to be used to perform three main tasks. The first task is word meaning acquisition (210), in which the meanings of prepositions like "toward" and nouns like "table" are learned from a data set of sentences describing paths driven by a vehicle. The second task is sentence generation (212), in which previously learned words are used to automatically produce a new sentence 216 that correctly describes an input vehicle-driven path. The third task is sentence comprehension (214), in which previously learned words are used to automatically produce a new path 218 that satisfies an input sentential description. These three tasks 210, 212 and 214 are automatically performed by the system 100 by optimizing the scoring function relative to different variables: acquisition task 210 is accomplished by optimizing the word-meaning parameters, generation task 212 is accomplished by optimizing the sentence, and comprehension task 214 is accomplished by optimizing the path.

The scoring function R(s, p, f, Λ) represents the truthfulness of a sentence s relative to path p driven by the vehicle in an environment described by a floorplan f, given a lexicon of word meanings. This function returns a relatively high score (e.g., above a predetermined threshold) when the sentence is true of the path taken by the vehicle through the environment, and a relatively low score (e.g., below the threshold) if it is false. A vehicle path p is represented as a sequence of 2D vehicle positions over time. A floorplan f comprises a set of 2D object positions with associated class labels, such as there being a "chair" at offset (2.5 m north, 1.7 m east) from the origin. For example, the sentence "The vehicle went toward the chair which is behind the table and then went away from the stool" makes a sequence of assertions about the position and velocity of the vehicle relative to two objects, the "chair" and the "stool". It also makes an assertion about the relative positions of two of the objects, the "chair" and the "table." A sentence s will have a certain degree of truthfulness describing a path p in a floorplan f. This truthfulness depends upon the relative position and velocity of the vehicle at different points in time with respect to the positions of the objects, as well as the relative positions of the objects with respect to each other. Since a sentence, or sequence of sentences, describing a path can make a sequence of assertions, computing the degree of truthfulness requires performing a temporal alignment between the elements in this sequence of assertions and portions of the vehicle path. A sentence may be true even if there are portions of the path that are not described. A sentence may be false, even if all the elements in the sequence of assertions have a corresponding portion of the path for which they are true, if they do not occur in the correct order. Thus, the scoring function must find the maximally true alignment between each such part of the sentence and a portion of the path such that the ordering of the path portions matches the ordering of the sentence parts and each part of the sentence is maximally true of its corresponding path portion.

The scoring function R(s, p, f, Λ) is compositional: the truthfulness of a sentence s is determined by evaluating and combining word-specific scoring functions which represent the meanings of nouns and prepositions in s, such as chair and toward. The meaning of each word is represented through a probability distribution whose specific form is determined by a set of word-specific parameters, Λ. "Compositionality" as used herein means that the aggregate scoring process for two different sentences may differ yet share parameters for the words in common. This allows the presently disclosed method to be generative: a combinatorially large set of possible sentences can be supported with even a small lexicon of nouns and prepositions. Moreover, this lexicon can be learned with a relatively small set of training examples.

The presently disclosed system and method makes possible three different use cases, simply by optimizing the function R with respect to different arguments. Automatic word-meaning acquisition is possible by optimizing R(s, p, f, Λ) with respect to the latent parameters Λ to maximize the predicted truthfulness of a data set of sentences $s_i$ describing vehicle paths $p_i$ through floorplans $f_i$ $$\hat{\Lambda} = \arg\max_{\Lambda} \prod_i \mathcal{R}(s_i, p_i, f_i, \Lambda). \tag{1}$$

The learned word meanings can then be used to perform two other tasks. Automatic generation of a sentence s that describes a vehicle path p through a floorplan f is possible by optimizing R(s, p, f, Λ) with respect to the sentence s to maximize its truthfulness given the path p, floorplan f, and model parameters $$\hat{s} = \operatorname*{argmax}_{s} \mathcal{R}(s, p, f, \Lambda). \tag{2}$$

Automatic production of a vehicle path p that satisfies a given sentence s (thus automatic comprehension of its meaning) is possible by optimizing R(s, p, f, Λ) with respect to the positions in the path p to maximize the truthfulness of the given sentence s in relation to the path p, floorplan f, and model parameters $$\hat{p} = \operatorname*{argmax}_{p} \mathcal{R}(s, p, f, \Lambda). \tag{3}$$

Acquisition is difficult because of both the natural ambiguity of the sentences, and ambiguity resulting from the fact that the meanings of the words are not known beforehand. A sentence does not specify which portion of each path is described by each of its parts. The alignment process inside the scoring function must determine this. Further, the sentences do not necessarily specify the particular objects being described or referenced, because nouns specify only the object classes, not specific objects in the floorplan. However, without knowing the meanings of the nouns, even the classes of the referenced objects are unknown. A sentence may include prepositional phrases to disambiguate the referenced objects, but this does not provide the information to determine the referenced objects during early stages of learning when the word meanings are still unknown. A single path-sentence pair has too much ambiguity to determine which objects are being referenced, or which parts of the sentence correspond to each portion of the path, let alone what relationships among the objects, or between the path and the objects, correspond to the meanings of the prepositions to be learned. However, the shared parameters between different sentences that arise from the use of some of the same words to describe different situations make it possible to use a number of path-sentence pairs together to disambiguate the sentence meanings and learn the word meanings through a gradual iterative learning procedure.

Generation is difficult for two reasons. First, the input path p is a dense sequence of points which need to be automatically segmented into portions, each of which is to be described by part of the sentence s. Second, the generated sentential parts must be unambiguous and concise. The goal is to generate a sentence that is true of the path, a sentence which is true only of that path and of no other qualitatively different paths, and the shortest sentence for which this is the case. This sentence may wish to situate the path relative to specific objects in the floorplan. There can be more than one instance of a given object class in the floorplan, so a complex noun phrase must be generated to uniquely refer to that object. The goal is to find the shortest noun phrase that does so.

Comprehension is difficult because the input sentence s is not a complete specification of the desired robot path p; it only incompletely specifies constraints over p. Path planning needs to be performed to find a complete path specification that not only satisfies the sentential constraints but also avoids obstacles.

The meaning of a sentence or sequence of sentences may be captured by representing the assertions they make. A sentence describing a vehicle path with respect to the environment makes assertions about the vehicle path and the objects in a floorplan. In order for the sentence to be true, all the assertions must also be true. For example, the sentence "The vehicle went toward the chair behind the table, and then went in front of the stool," denotes a sequence of two sets of assertions. The first set includes four assertions: 1) the vehicle's path brings it toward an object; 2) that object is called a chair; 3) the chair is behind another object; and 4) that other object is called a table. The second set includes two assertions: 1) the vehicle's path brings it in front of an object and 2) that object is called a stool. Further, the sequential nature of the sentence provides an additional assertion that the second set of assertions must be fulfilled after the first is fulfilled in order for the sentence to be true.

The system 100 represents the meaning of such a sequence of assertions with a sequence of graphical models which are grounded in the path 204, which is a sequence of waypoints, the 2D positions of the vehicle 160 over time, and the floorplan 206, which comprises a set of floorplan objects, given as labeled 2D points representing the position and class of objects in the environment. Each graphical model is a product of factors. Each factor is a probability distribution representing one of the assertions in the sentence, and corresponds to a word or clause in a sentence. Continuing the above example, there is a factor representing the assertion that the vehicle's path moves toward an object. This factor is a probability distribution between a path variable, which is a pair of 2-D vectors representing the position and velocity of the robot at a particular time, and a floorplan variable, which is a labeled 2-D Cartesian coordinate representing the class and position of a floorplan object. The model parameters $\Lambda$ define the shape of each factor distribution and thus define the meaning of each word, such as toward. Such a distribution encodes the meaning of a preposition like toward by placing probability mass on certain relative velocities and positions between the path variable and the floorplan variable that satisfy the spatial relationship defined by the word. In general, a factor distribution corresponding to a preposition can be applied between a path variable and a floorplan variable to define its adverbial usage, as shown above, or between two floorplan variables, to define its adjectival usage, such as the distribution corresponding to one object being behind another. Other distributions can encode the meanings of nouns like "chair" or "table" by placing probability mass on certain values of a floorplan variable's label. Further details of how each factor distribution is defined in terms of the parameters in are described below.

The product of factors in each graphical model captures the meaning of each set of assertions in the sequence. Just as the sentence is false if any individual assertion is false, the product of factors is close to zero if any of the individual factors is close to zero. Given any assignment of values to the path variable and floorplan variables, the graphical model employed by the system 100 will produce a score value corresponding to the veracity of that sentence clause with respect to the robot path and objects defined by those path and floorplan variables. The meaning of a sentence or sequence of sentences is therefore captured by a corresponding sequence of graphical models when they are constrained to be satisfied in the proper sequence.

Figure 3:
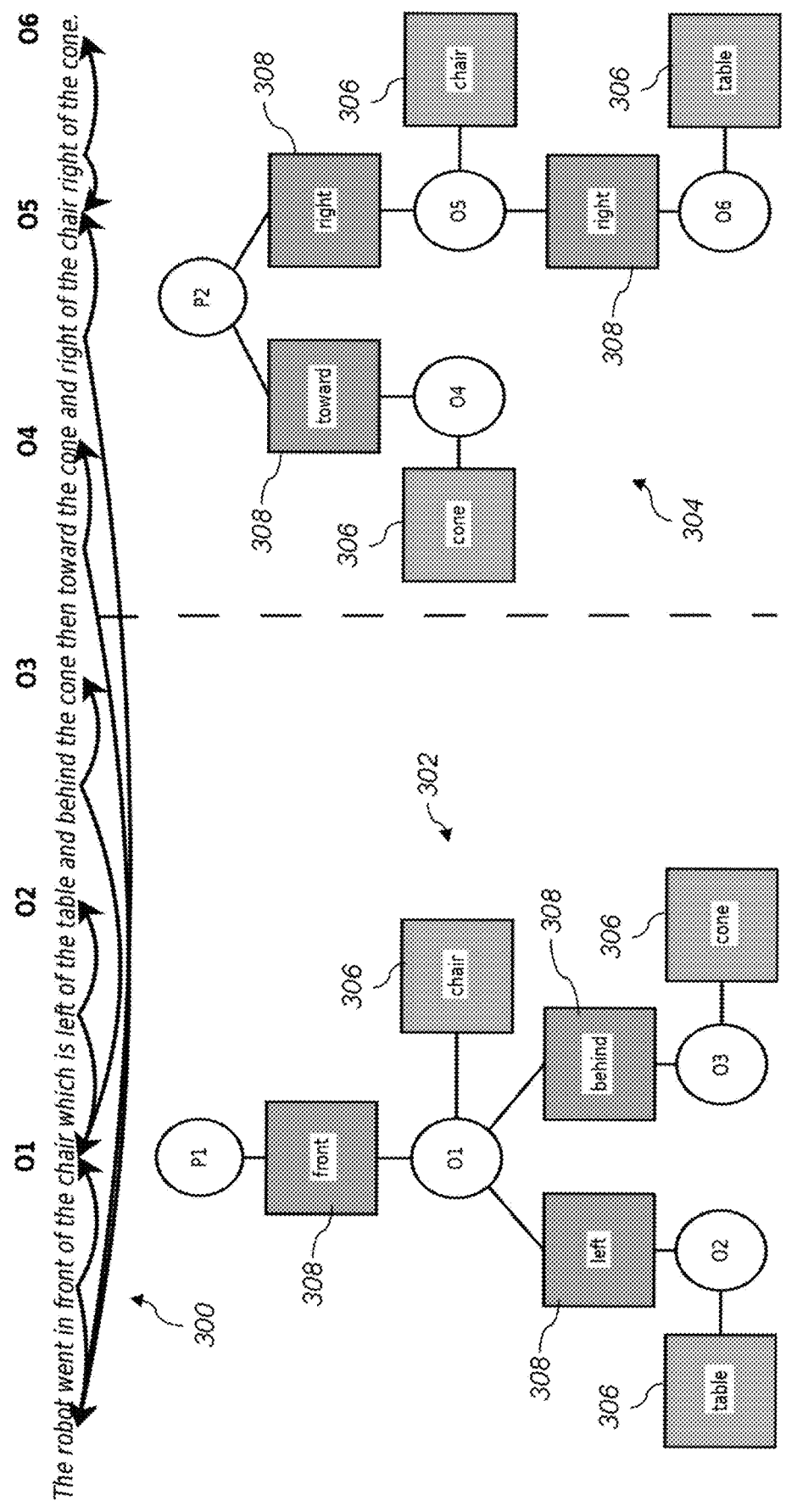
FIG. 3 illustrates graphical models produced by the system of FIG. 1 based on sentence input according to various aspects.

The system 100 automatically generates such a sequence of graphical models directly from a sentence or sequence of sentences. The sentence(s) are first broken into temporal segments using a subset of the rules of English grammar and a graphical model is produced for each segment. FIG. 3 illustrates this process, showing an example sentence 300 and a sequence of two graphical models 302 and 304 produced from it. A path variable (circles P1 and P2 in FIG. 3) is created for each graphical model, representing the position and velocity of the vehicle 160 during that segment of the path. A floorplan variable (circles O1-O6) is created for each noun instance in the sentence(s), representing the position and label of an object in the floorplan. The position and label of a floorplan variable can be taken from the 2D position and class label of any object in the provided floorplan. Each noun in a sentence also results in a univariate distribution (rectangles 306 connected to the associated floorplan variable) over possible class labels that the floorplan variable may take.

Each preposition in a sentence induces a joint distribution between the two variables to which it is applied. These are the target and referent objects. FIG. 3 shows the distribution for each preposition as a rectangle 308 connecting the target object (top circle) and referent object (bottom circle). For example, in the clause "The robot went in front of the chair which is left of the table and behind the cone," the phrase "the robot went in front of the chair" results in the "front" preposition distribution applied between the target object, path variable P1 (the vehicle), and the referent object, floorplan variable O1 (the chair). There is a noun (chair) distribution also applied to the label of O1, along with an additional two other preposition distributions (left and behind) resulting from the other phrases, left of the table and behind the cone. Note that O1 is the referent object of front but the target object of left and behind.

Once the arguments to each preposition in a temporal segment have been found, the system 100 forms the graphical model as a product of the factors associated with each of the nouns and prepositions. For a given assignment of values to each path variable (position and velocity) and floorplan variable (position and label), the graphical model's probability represents the degree to which those values satisfy the meaning of the sentence.

The lexicon specifies the meanings of the nouns and prepo-sitions as a set of probability distributions. The nouns are represented as discrete distributions over the set of class labels. These labels are abstract symbols corresponding to object classes, such as might be obtained by grouping object detections according to class with a clustering algorithm on sensor data. For example, objects of class bag might have class label CLASS0, while objects of class stool might have label CLASS4. These come from the provided floorplans, which are lists of objects each consisting of a 2D position and class label. Observe that the class labels do not uniquely specify an object in a floorplan because there are often multiple objects of the same class in a given floorplan.

Each noun i in the lexicon consists of a set of weights wij which score the mappings between it and each possible label j. When a noun distribution is applied to a floorplan variable, it gives a score to the label assigned to that variable.

Figure 5B:
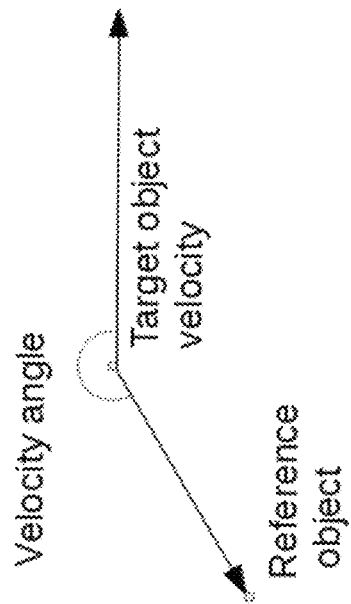
FIG. 5B illustrates velocity angle for a target relative to a reference object according to various aspects.
Figure 5A:
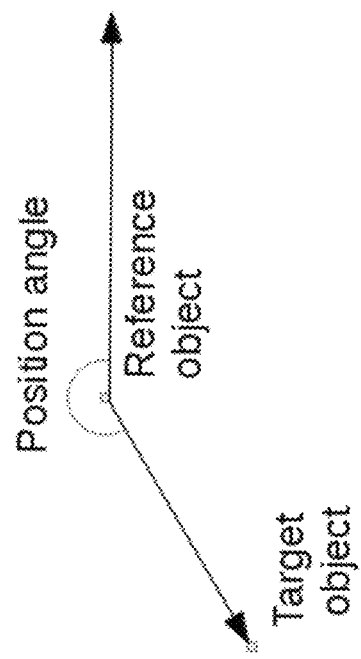
FIG. 5A illustrates position angle for a target object relative to a reference object according to various aspects.

Each floorplan variable generated from a sentence can be mapped to one of the objects in a floorplan, taking its position and class label. When mapped to the kth object, whose label is Ik and which resides at location (xk, yk), the score of the noun distribution i applied to that variable is wi,lk Prepositions specify relations between target objects and referent objects. The target object of a preposition may be an object in the floorplan when the preposition is used adjectivally to describe a noun or may be a waypoint in the robot's path when used adverbially to describe the robot's motion. For example, in "the chair to the left of the table," the floorplan variable corresponding to the noun chair is the target object and the floorplan variable corresponding to table is the referent object, whereas in the phrase, went toward the table, the path variable is the target object while the floorplan variable corresponding to table is the referent object. The lexical entry for each preposition in is specified as the location u and concentration x parameters for two independent von Mises distributions over angles between target and referent objects. One, the position angle, is the orientation of a vector from the coordinates of the referent object to the coordinates of the target object (FIG. 5A). The second, the velocity angle, is the angle between the velocity vector of the target object and a vector from the coordinates of the target object to the coordinates of the referent object (FIG. 5B). This second angle is only used for adverbial uses describing the robot path, because it requires computation of the direction of motion, which is undefined for stationary objects. This angle is thus taken from the frame of reference of the vehicle.

The von Mises distribution defining each angular distribution $v(\alpha|\mu, \kappa)$ is given by $$v(\alpha|\mu, \kappa) = \frac{e^{\kappa \cos(\alpha-\mu)}}{2\pi I_0(\kappa)} \quad (3.1)$$

where $I_0$ is the modified Bessel function of order 0.

When the ith preposition in the lexicon is applied between two variables, whose physical relationship is specified by the position angle $\theta$ and velocity angle $\gamma$ between them, its score $z_i$ is given by $$z_i(\theta, \gamma) = \left(\frac{e^{\kappa_{i,1} \cos(\theta-\mu_{i,1})}}{2\pi I_0(\kappa_{i,1})}\right)\left(\frac{e^{\kappa_{i,2} \cos(\gamma-\mu_{i,2})}}{2\pi I_0(\kappa_{i,2})}\right) \quad (3.2)$$

where $\mu_i, 1$ and $\kappa_i, 1$ are the location and concentration para-meters of the position angle distribution of the i th preposition, and $\mu i, 2$ and $\kappa i, 2$ are the location and concentration parameters of the velocity angle distribution.

Once constructed from a sentence segment, each graphical model induces a distribution over the path variable $\rho=(\rho^x, \rho^y, \rho^{vx}, \rho^{vy})$ conditioned on the K objects in the floor-plan f=(O1, ..., OK) and the latent mapping m from the N floorplan variables to floorplan objects. Each element of the mapping mn is the index of the floorplan object mapped to floorplan variable n. This latent mapping designates which objects in the floorplan are referred to by each noun in the sentence. Let $\alpha$ be $\{\rho, o_{m_1}, \ldots, o_{m_N}\}$, a set consisting of the path variable and the floorplan objects mapped to each of the N floorplan variables. Further, let $b_{c,1}$ and $b_{c,2}$ be the indices in $\alpha$ of the target and referent, respectively, of the cth preposition in the graphical model. The 2-D world position of the target and referent of the cth preposition can then be referenced with $(\alpha_{b_{c,1}}^x, \alpha_{b_{c,1}}^y)$ and; $\alpha_{b_{c,2}}^x, \alpha_{b_{c,2}}^y$, resepectively. The velocity vector fo the target can similarly be referenced with $(\alpha_{b_{c,1}}^{vx}, \alpha_{b_{c,1}}^{vy})$. Therefore, the position angle of the target and refedrent of the cth preposition in the graphical model is given by $$\theta_c = \tan^{-1} \frac{a_{b_{c,1}}^y - a_{b_{c,2}}^y}{a_{b_{c,1}}^x - a_{b_{t,2}}^x} \quad (3.3)$$

and the velocity angle $\gamma_c$ between them is given by $$\gamma_c = \tan^{-1} \frac{a_{b_{c,1}}^{vy}}{a_{b_{c,1}}^{vx}} - \tan^{-1} \frac{a_{b_{c,2}}^y - a_{b_{c,1}}^y}{a_{b_{c,2}}^x - a_{b_{c,1}}^x} \quad (3.4)$$

A sentence-segment graphical model's conditional probability $\psi(\rho|m, f, \Lambda)$ of the path variable given an object mapping m, floorplan f, and lexicon parameters is therefore given by the product of preposition and noun scores $$\psi(\rho|m, f, \Lambda) = \prod_{c=1}^{C} z_{d_c}(\theta_c, \gamma_c) \prod_{n=1}^{N} \omega_{e_n, l_{mn}} \quad (4)$$

where c indexes into the C prepositions in the graphical model, $d_c$ is the index in the lexicon of the cth preposition in the graphical model, n indexes into the N nouns in the graphical model, $e_n$ is the index in the lexicon of the nth noun in the graphical model, and $l_{mn}$ is the class label of the object mapped to the nth noun.

Figures 4A, 4B:
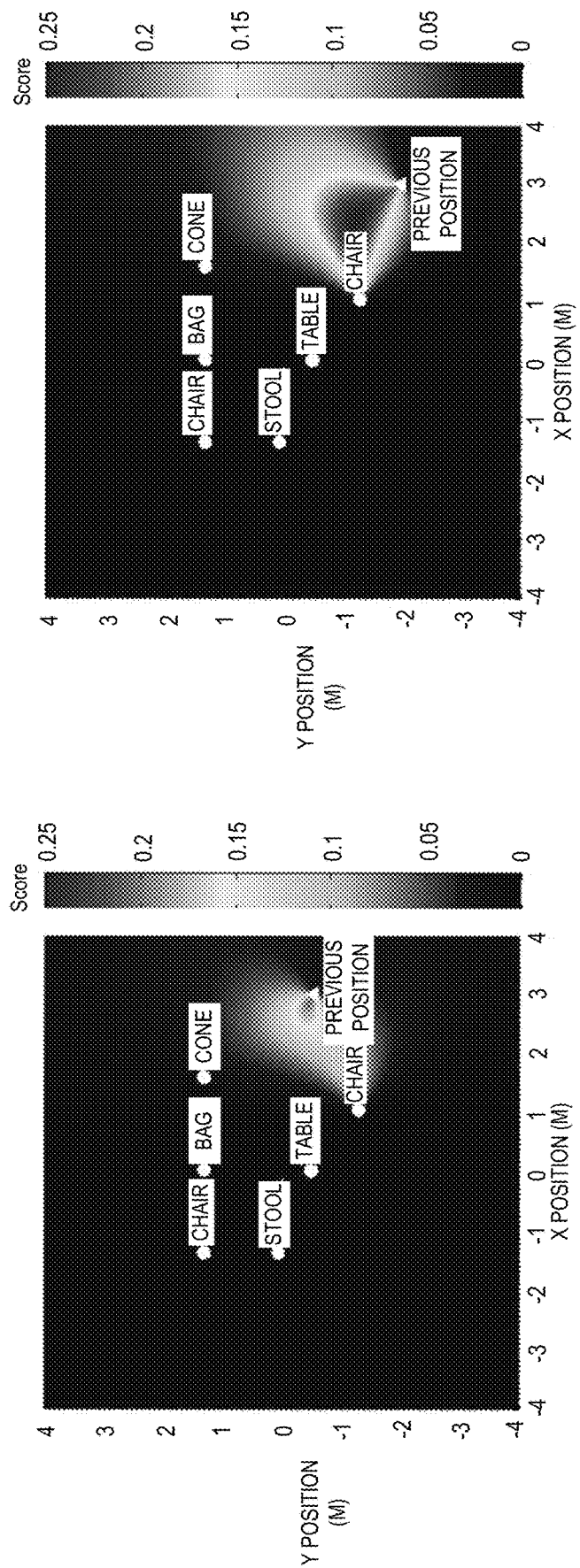
FIG. 4A illustrates a scoring function induced by the sentence-segment graphical model of FIG. 3 for a first vehicle position according to various aspects.
FIG. 4B illustrates a scoring function induced by the sentence-segment graphical model of FIG. 3 for a second vehicle position according to various aspects.

FIGS. 4A and 4B visualize the score of the second (right) graphical model in FIG. 3. This score is plotted as a function of the position of the path variable in a 2D floorplan. Two plots (FIGS. 4A and 4B) are shown, with different positions for the previous path variable. The two plots have very different shapes because of differing previous positions, but both show that the highest scoring positions (in red) satisfy the intuitive meaning of the clause "toward the cone and right of the chair right of the table." Moving from each of the two previous positions to a high scoring region results in motion toward the correct object and results in a position right of the correct object. These scores were produced by summing over all possible mappings m, using models learned automatically as described below.

The acquisition 210, generation 212, and comprehension 214 tasks are formulated around the same scoring function. To perform acquisition task 210, the system 100 formulates a large set of hidden Markov models (HMMs), one for each path-sentence pair in the training corpus. Each such "sentence" may be either a single sentence or possibly a sequence of sentences. The sentences and sequences of sentences are treated identically by identifying the sequence of temporal segments in the text and creating an HMM representing the sequence. Each such HMM has a state corresponding to every temporal segment/in its corresponding training sentence(s). The observations for each such HMM consist of the sequence of waypoints in the path-sentence pair. The output model Rt for each state is the graphical model constructed from that temporal segment t, given the current estimate of the parameters in and marginalized over all mappings m between floorplan variables in the graphical model and objects in the floorplan $$R_t(\rho_t, f, \Lambda) = \sum_m \psi_t(\rho_t \mid m, f, \Lambda).$$

The transition matrix for each HMM is constructed to allow each state only to self loop or to transition to the state for the next temporal segment in the training sentence. The HMM is constrained to start in the first state and ends in the last. Dummy states, with a fixed uniform output probability, are placed between the states for each pair of adjacent temporal segments, as well as at the beginning and end of each sentence, to allow for portions of the path that are not described in the associated sentence. These are added because a sentence can be true without describing every portion of the path, to allow the model to score highly in such situations.

Figure 6:
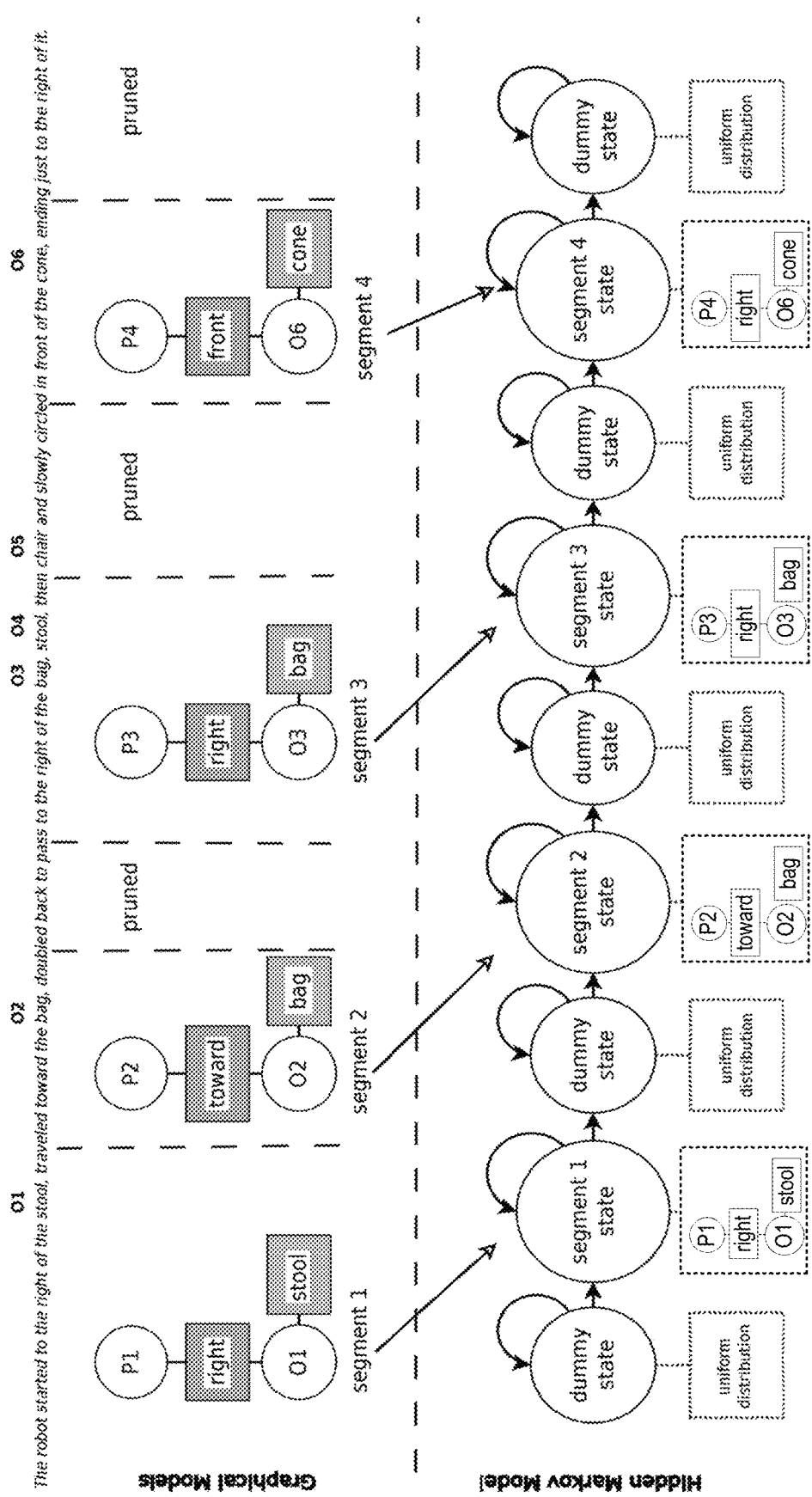
FIG. 6 illustrates an automatic construction process of a Hidden Markov Model (HMM) from a sentence according to various aspects.

FIG. 6 illustrates an automatic construction process of such an HMM from a sentence by the system 100. The sentence being processed is "The robot started to the right of the stool, traveled toward the bag, doubled back to pass to the right of the bag, stool, then chair and slowly circled in front of the cone, ending just to the right of it." The sentence if broken into segments and a graphical model is created representing each segment, as described above. When a segment cannot be understood, it is pruned, and no graphical model is created. Next, an HMM state is created for each remaining segment. The output model of each such state represents the distribution over the possible positions and velocities of the robot at a given point in time. These output distributions are the graphical models associated with each segment, marginalized over the possible labelings of the floorplan variables. Dummy states are added. The HMM transition distribution encodes the sequence of the sentence by forcing each state to self transition or pass to the next state, as well as by requiring that the model begin in the first state and end in the last.

Figure 7A:
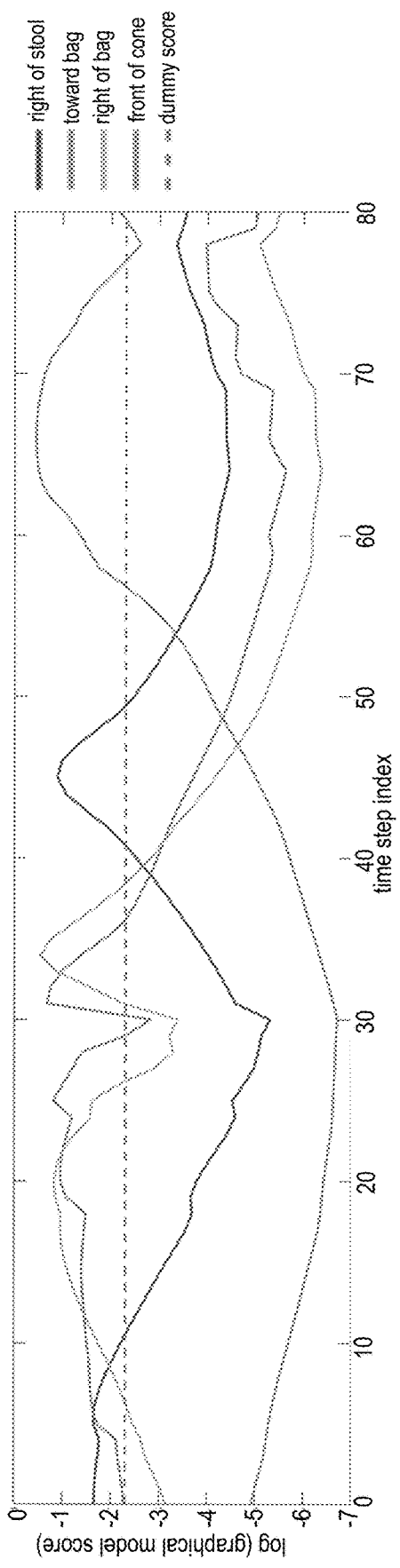
FIG. 7A is a graph showing an output score of each state in the sentence HMM computed along the vehicle path according to various aspects.
Figure 7B:
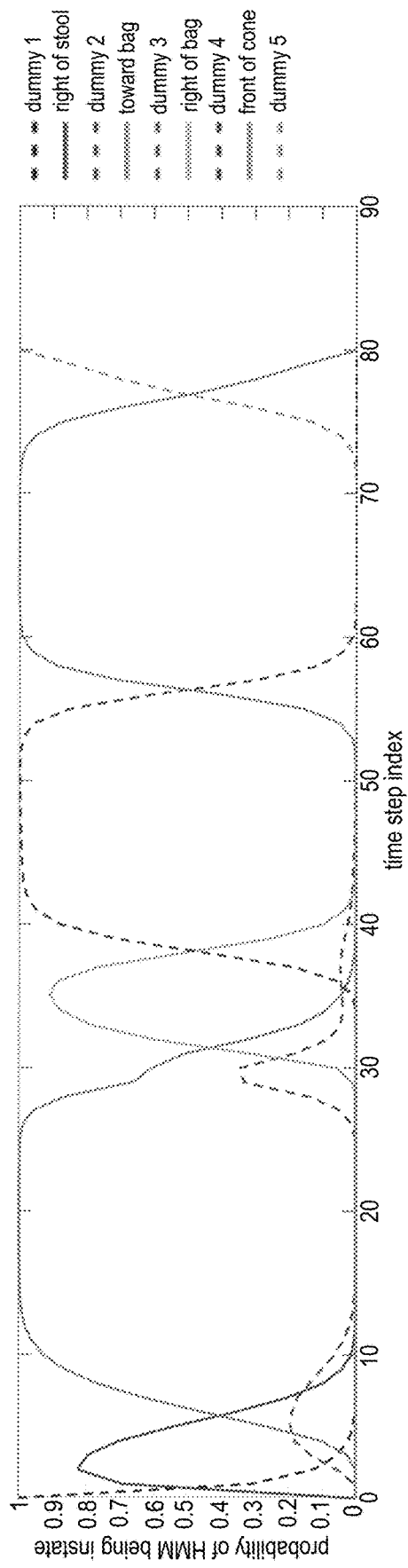
FIG. 7B is a graph showing probablility of the HMM being in each state at each point along the vehicle path.

The HMMs are used to infer the alignment between the densely sampled points in each path and the sequence of temporal segments in its corresponding sentence. This process is further illustrated in FIGS. 7A and 7B. An HMM is produced to represent the semantics of the sentence (the same sentence and HMM as in FIG. 6). Each HMM output model computes the score of the position and velocity at each waypoint (FIG. 7A). This reflects an estimate of how true each part of the sentence is of each portion of the path. Each state's output score is the likelihood of the associated graphical model, marginalized over all possible mappings of floorplan variables to floor-plan objects. These scores, along with the HMM transition model, can be used with the forward-backward algorithm to compute the probability of the HMM being in each state (FIG. 7B) at each point in the path. This also yields the HMM likelihood, which is an estimate of how true the entire sentence (or sequence of sentences) is of the path.

Prior to learning the word meanings, all preposition and noun distributions are random. During acquisition of such meanings, the model is iteratively updated to increase the overall HMM likelihood taken as a product over all training samples. At each iteration, this gradually concentrates the probability mass of each HMM state's preposition distributions at those angles seen at portions of the path during which that state is of high probability. It also concentrates the probability mass of the object label distributions in those bins associated with the mappings corresponding to high HMM likelihoods.

Figure 8:
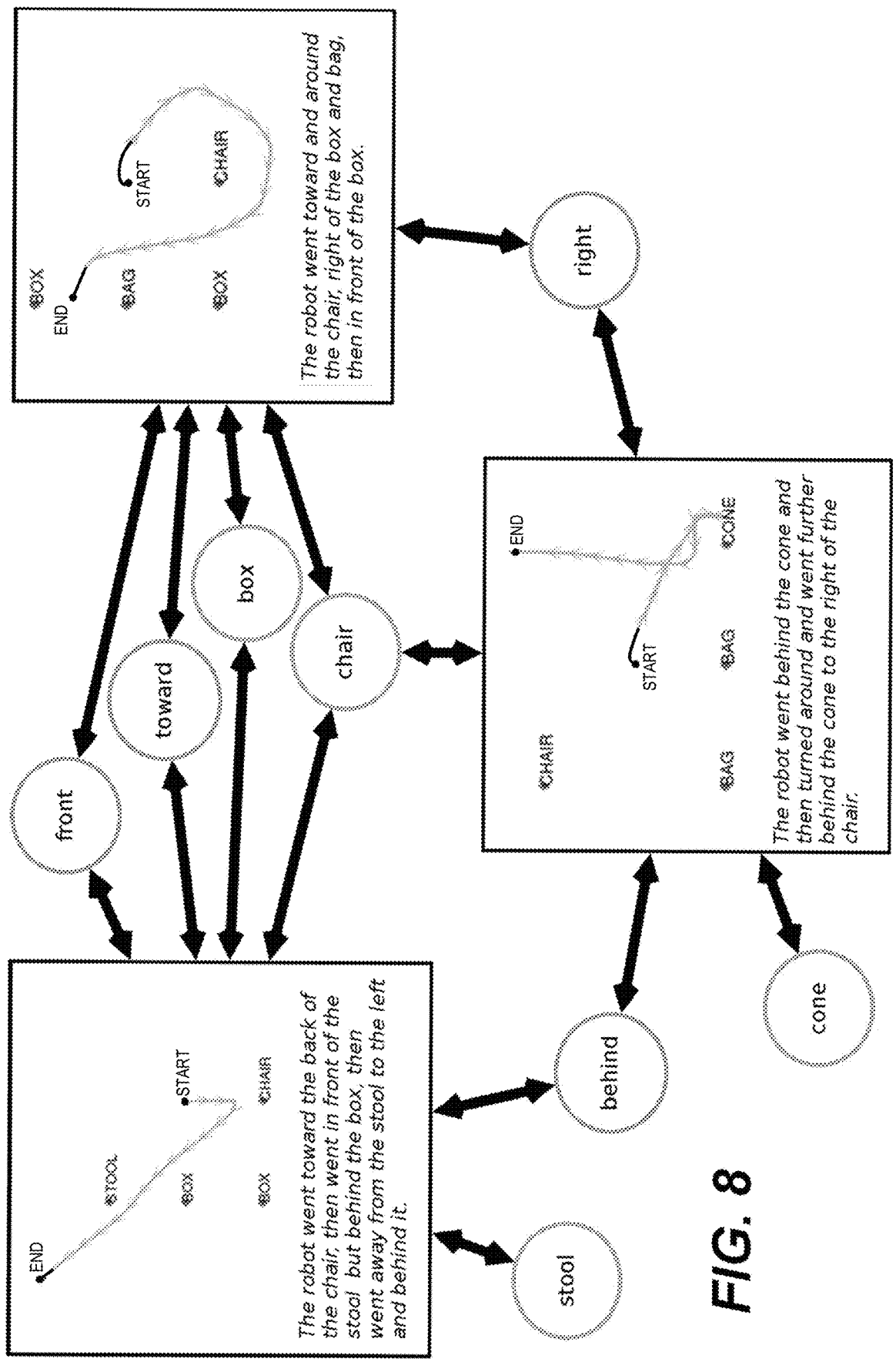
FIG. 8 is a diagram illustrating a vehicle control learning process according to various aspects.
Figures 9A, 9B:
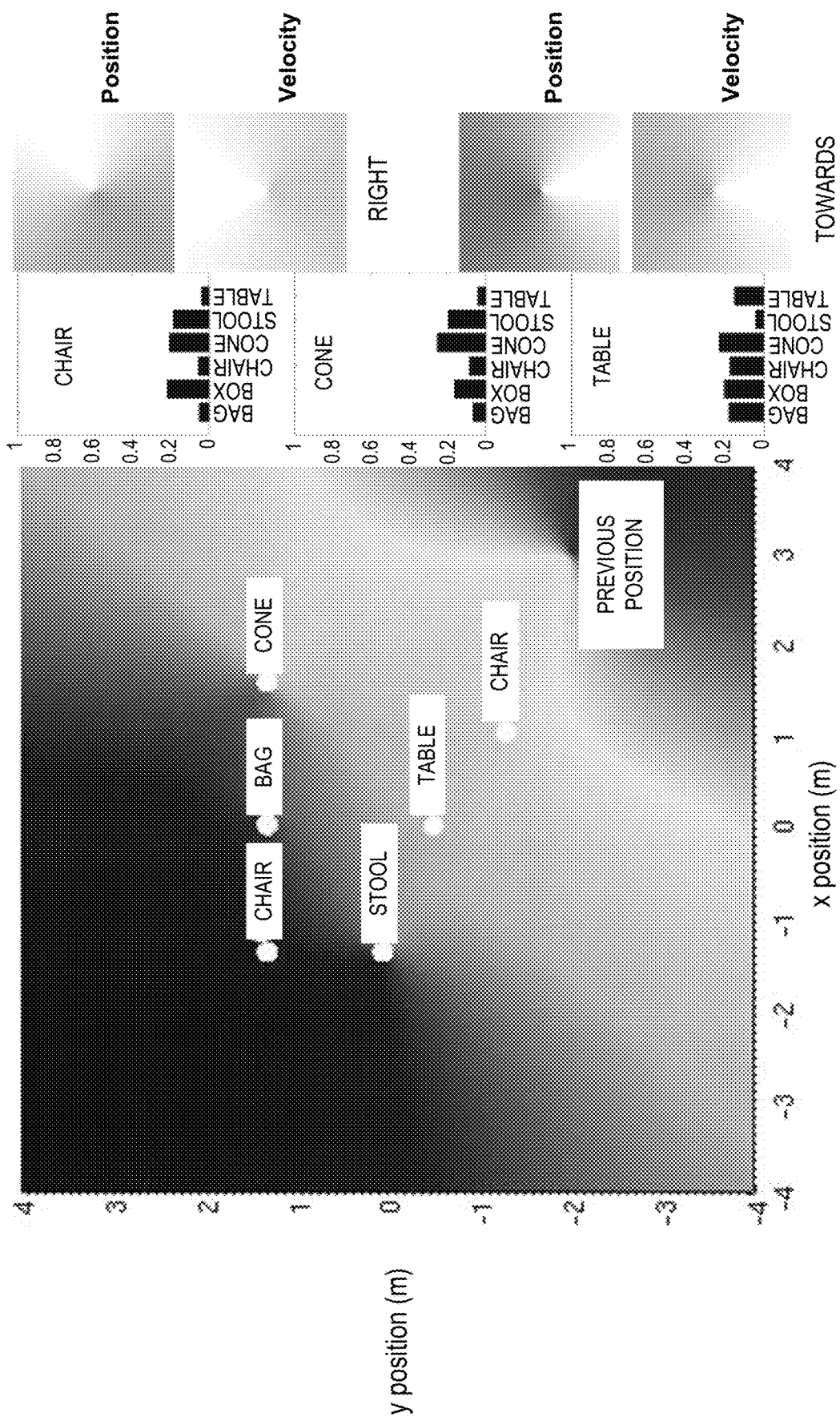
FIGS. 9A-B is a plot illustrating word meanings and resulting scoring function at a first iteration in a learning process according to various aspects.
Figures 10A, 10B:
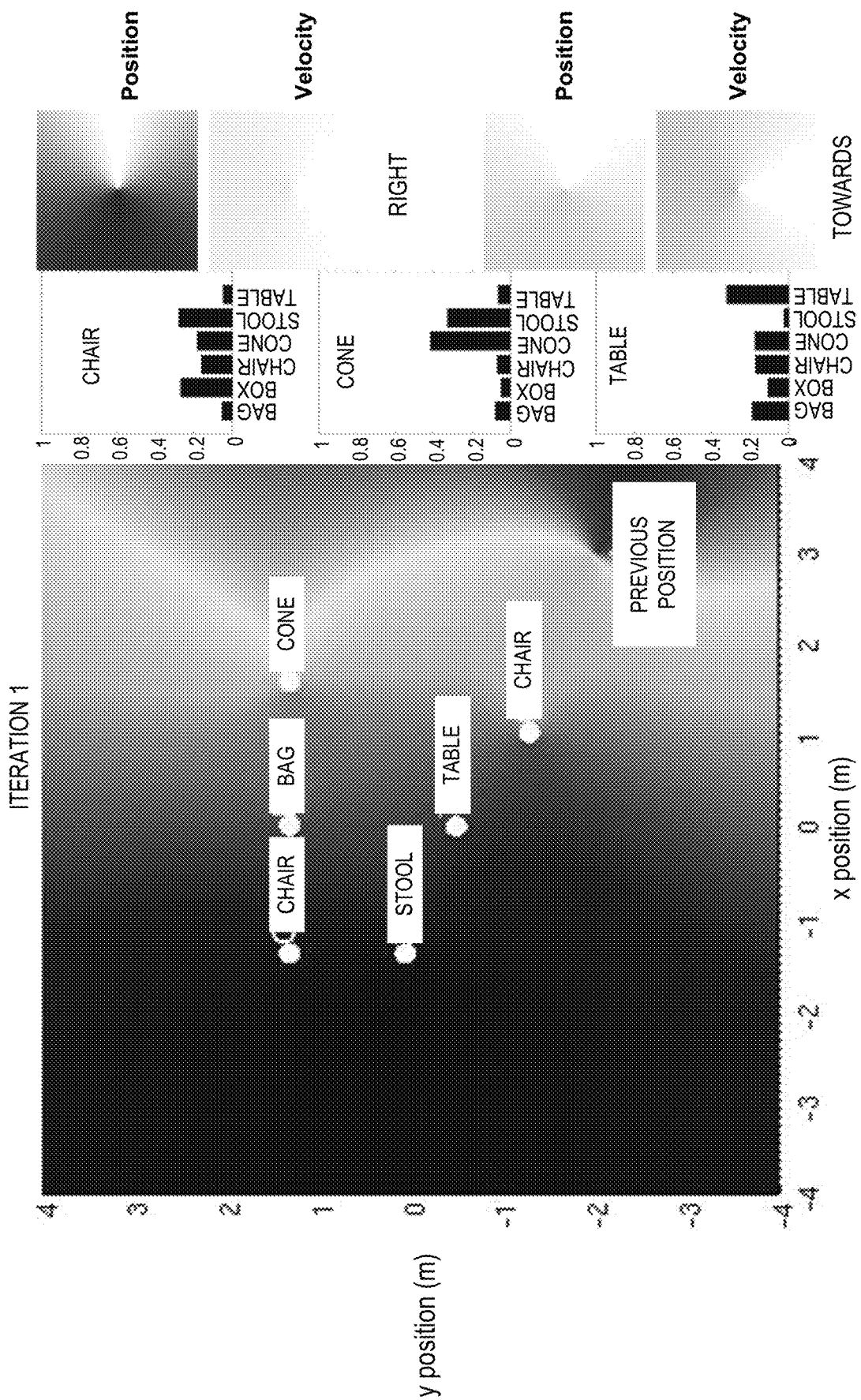
FIGS. 10A-B is a plot illustrating word meanings and resulting scoring function at a second iteration in a learning process according to various aspects.
Figures 11A, 11B:
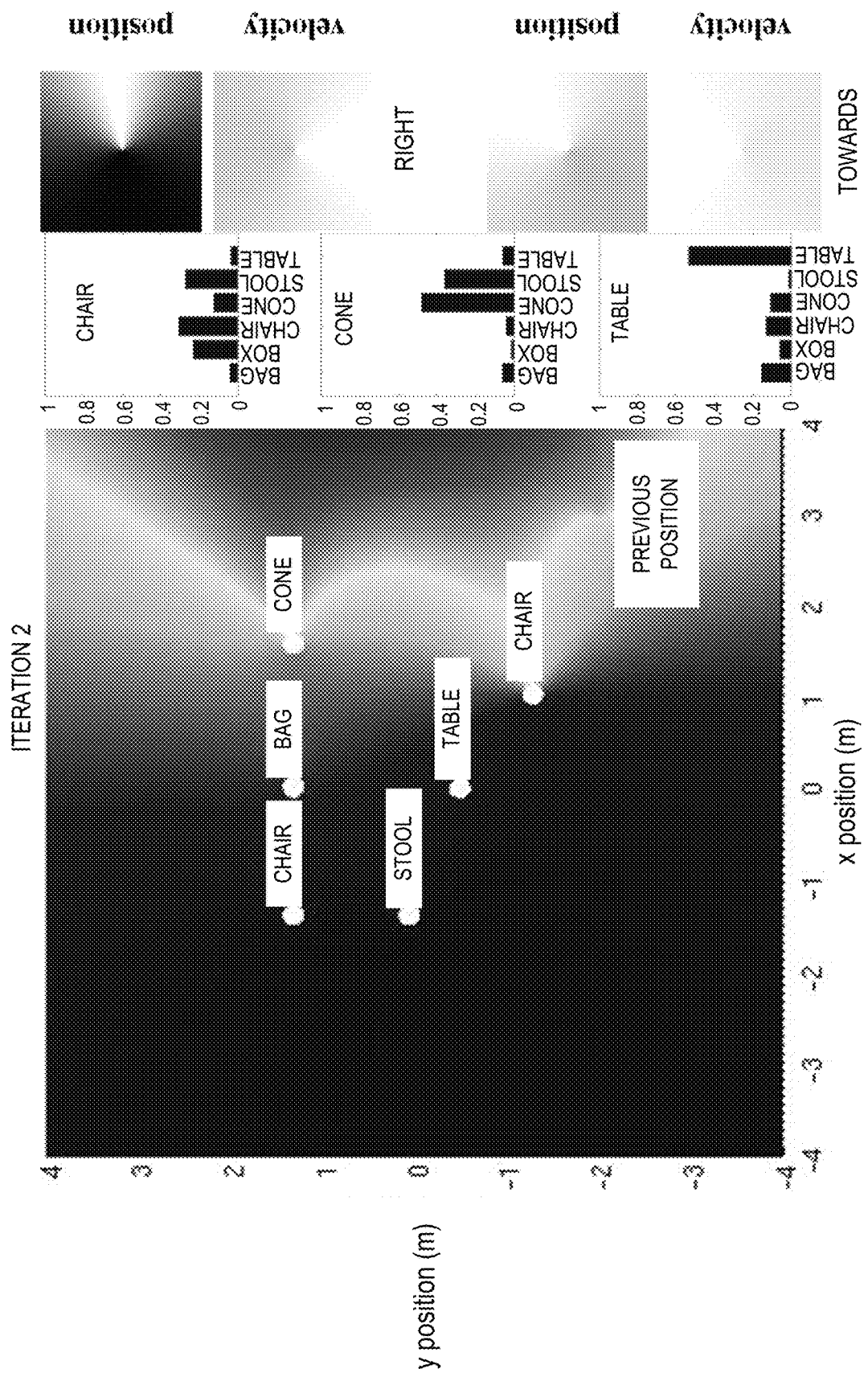
FIGS. 11A-B is a plot illustrating word meanings and resulting scoring function at a third iteration in a learning process according to various aspects.
Figures 12A, 12B:
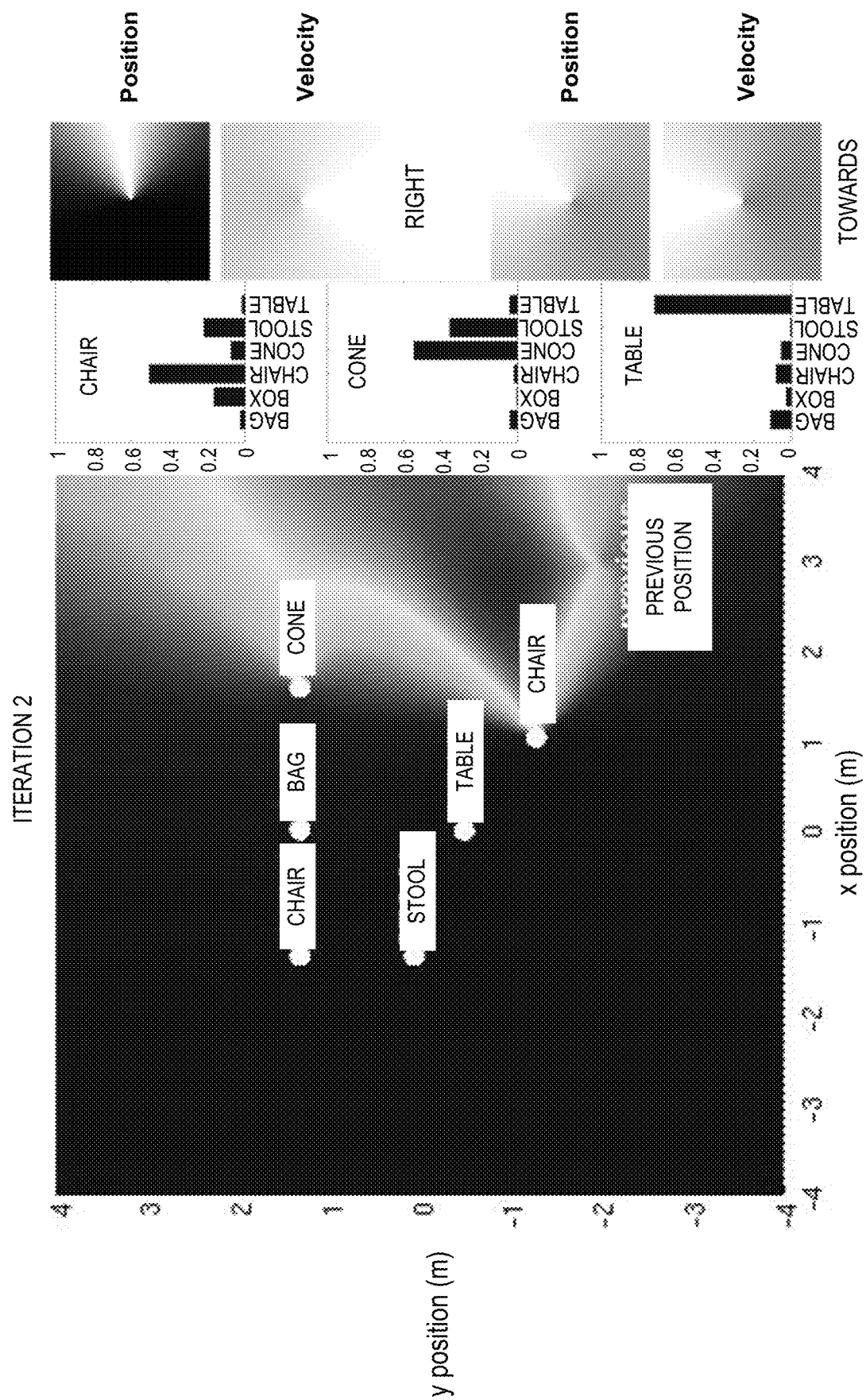
FIGS. 12A-B is a plot illustrating word meanings and resulting scoring function at a fourth iteration in a learning process according to various aspects.

The system 100 parameterizes the output models for the HMMs by the word meanings from the lexicon. Thus, the meaning of each word is constrained by many path-sentence pairs. As illustrated in FIG. 8, this can be thought of as a large (soft) constraint-satisfaction problem. This mutual constraint allows the system 100 to gradually infer the unknown mappings between points in the paths and the segments of sentences, and between nouns in the sentences and objects in the floorplans, while simultaneously learning the parameters of the lexicon. Thus, it uses its current estimate of the word meanings to infer which physical relationships between the robot and the objects, or between several objects, are being described, and uses this knowledge to further update the word meanings in order to match those relationships.

This learning is accomplished by maximizing the product of the likelihoods of all HMMs on their corresponding paths through Baum-Welch. This trains the distributions for the words in the lexicon as they are tied as components of the output models. Specifically, it infers the latent alignment between the large number of noisy robot waypoints and the smaller number of temporal segments in the training descriptions while simultaneously updating the meanings of the words to match the relationships between waypoints described in the corpus. In this way, the meanings of both the nouns and the prepositions are learned. FIGS. 9-12 illustrate the gradual learning process by showing how the scoring function corresponding to an example phrase begins in a completely meaningless state, but gradually changes to represent the meaning of that phrase as the meanings of the words are gradually learned. The angular distributions of the prepositions are rendered as potential fields with points at angles with higher probability rendered lighter. Iteration 0 (FIG. 9A-B) shows the randomly initialized word models, and the resulting score surface, which does not encode the meaning of the phrase at all. The noun distributions are largely uniform, resulting in no visible correlation between the score and the individual object positions. After the first iteration (FIG. 10A-B), the noun models have just begun to concentrate in the correct bins, and the position distribution of the right model is beginning to concentrate in the correct direction. This change is evident in the score surface, which shows that it depends upon the position of the cone, but not in the correct way, as the toward model is still completely wrong. After the second iteration (FIG. 11A-B), the noun distributions are further concentrated in the correct bins, and the toward velocity distribution is now pointed in the correct direction, although still almost uniform. The score surface now clearly depends on both the cone and the proper chair.

After the third iteration (FIG. 12A-B), the noun distributions are further concentrated, as are both the position angle distribution of the right model and the velocity angle distribution of the toward model. The score surface now largely represents the meaning of the phrase: moving from the previous position to a high scoring red region results in motion that satisfies the phrase. Iteration 3 is beginning to look similar to that in FIG. 4, which is the result after convergence.

To perform generation task 212, the system 100 searches for a sentence to describe a path in a floorplan. This sentence is constructed as a sequence of prepositional phrases, where the objects of the prepositions are noun phrases. The sentence is expected to satisfy three properties: 1) correctness that the sentence be logically true of the path; 2) completeness that the sentence differentiate the intended path from all other possible paths on the same floorplan; and 3) conciseness that the sentence be the shortest one that satisfies the previous two properties. The system 100 attempts to find a balance between these properties using a process 1000 shown in FIG. 13.

In the first step of process 1000, the system 100 produces the most likely preposition-object pair for each waypoint. A preposition takes a waypoint from the vehicle path as its first argument and a floorplan object (e.g., chair) as its second argument. Thus, each preposition scores how likely the vehicle has a certain spatial relationship with a reference object at the current waypoint. For each waypoint, the system computes the probabilities of all the possible prepositions each with all the possible reference objects on the floorplan, and select the preposition-object pair with the maximum posterior probability. This yields a sequence of selected preposition-object pairs, whose length is equal to the number of waypoints. Identical preposition-object pairs for consecutive sets of waypoints in the path are coalesced into intervals, and short intervals are discarded.

The system 100 then generates a noun phrase to describe the reference object of the selected preposition-object pair at each waypoint. The system takes the noun with maximum posterior probability over all the possible nouns, given the class of that floorplan object. Thus, when the floorplan contains a single instance of an object class, it can be referred to with a simple noun. However, sometimes there might be more than one floorplan object that is described with the same noun. A simple noun in this case would introduce ambiguity into the generated sentence. To avoid such, the shortest possible noun phrase, with one or more prepositional phrases, is generated to disambiguate references to these objects. To this end, for each pair of floorplan objects, the system takes the preposition with maximum posterior probability to be true of that pair and all other prepositions applied to that pair to be false. By doing so, the system assigns each floorplan object with a unique noun phrase that is able to distinguish it from all the others on the same floorplan.

More formally, let q(o) be the most probable noun for floorplan object o given A. For each pair (o, o) of floorplan objects, there exists only one preposition o that is true of this pair. Let u(o) be the noun phrase we want to generate to disambiguate the floorplan object o from others o'. Then o can be referred to with u(o) unambiguously if: 1)u(o)=(q(o), { }) is unique or 2) there exists a collection {φ(o, o'), . . . } of prepositional phrases such that formula u(o)=(q(o), {(φ, u(o')), . . . }) is unique. To produce a concise sentence, we want the size of the collection of prepositional phrases in step 2 to be as small as possible. However, finding the smallest collection of modifiers is NP-hard. To avoid exhaustive search, we use a greedy heuristic that biases toward adding the least frequent pairs ((φ,u(o')) into the collection until u(o) is unique. This results in a tractable polynomial algorithm. The u(o) so found is mapped to a noun phrase by simple realization, for example:

(TABLE, {(LEFTOF, CHAIR), (BEHIND, TABLE)})
becomes
the table which is left of the chair and behind the table.

Figure 13:
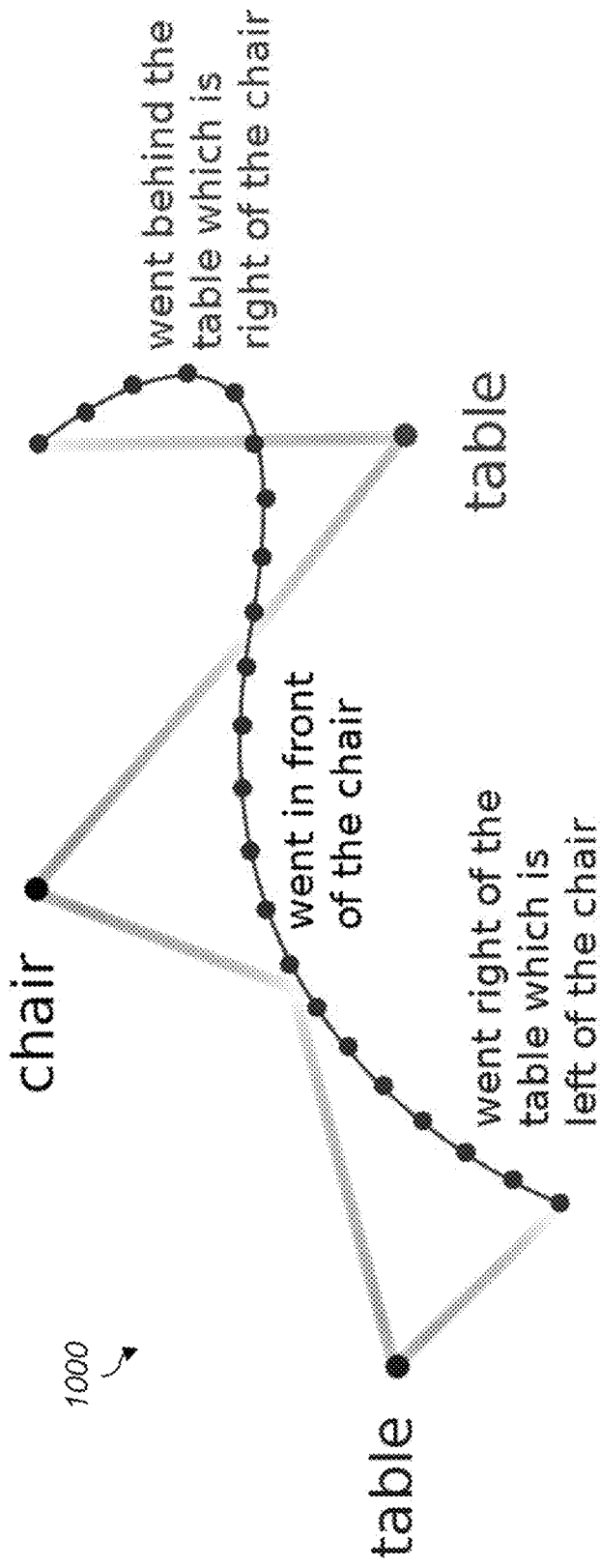
FIG. 13 is a diagram illustrating a sentence generation process according to various aspects.
Figure 14:
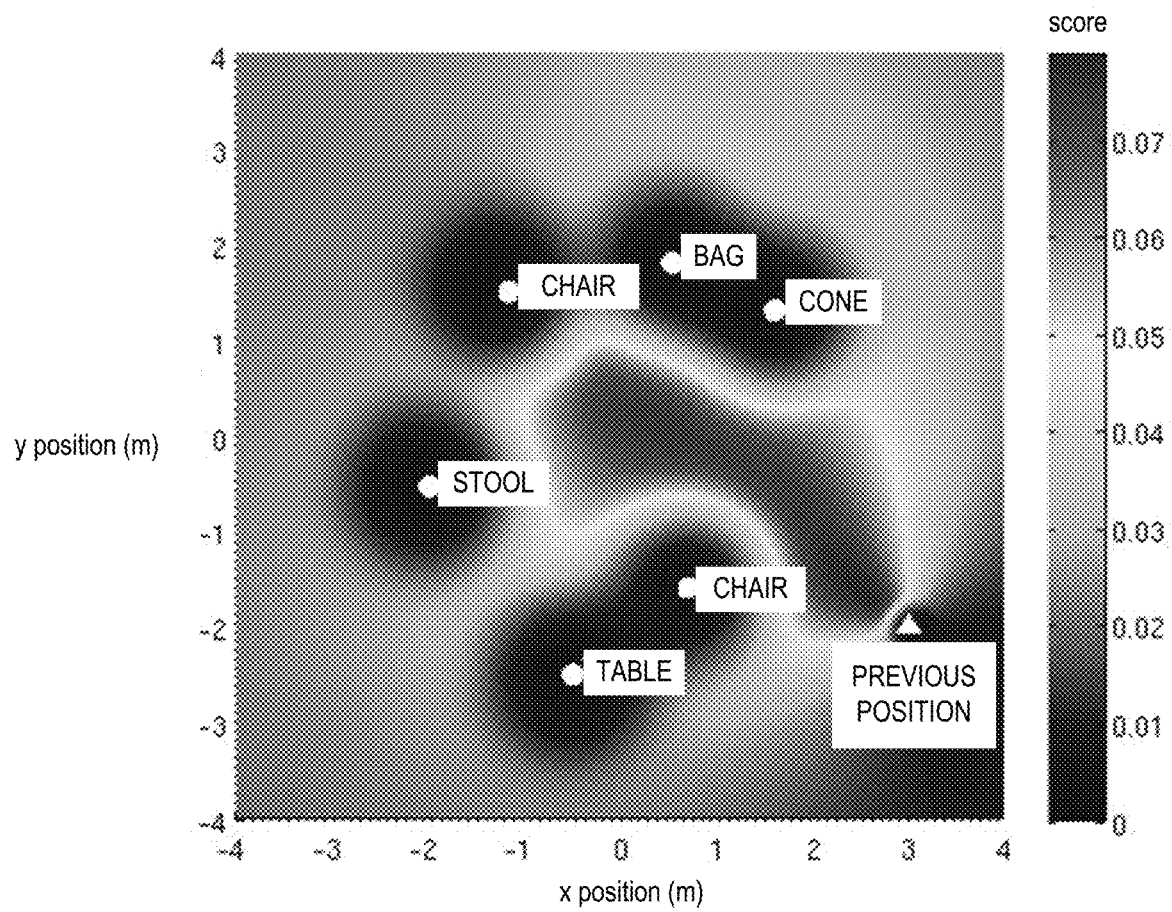
FIG. 14 illustrates a scoring function after the addition of barrier penalties according to various aspects.
Figure 15:
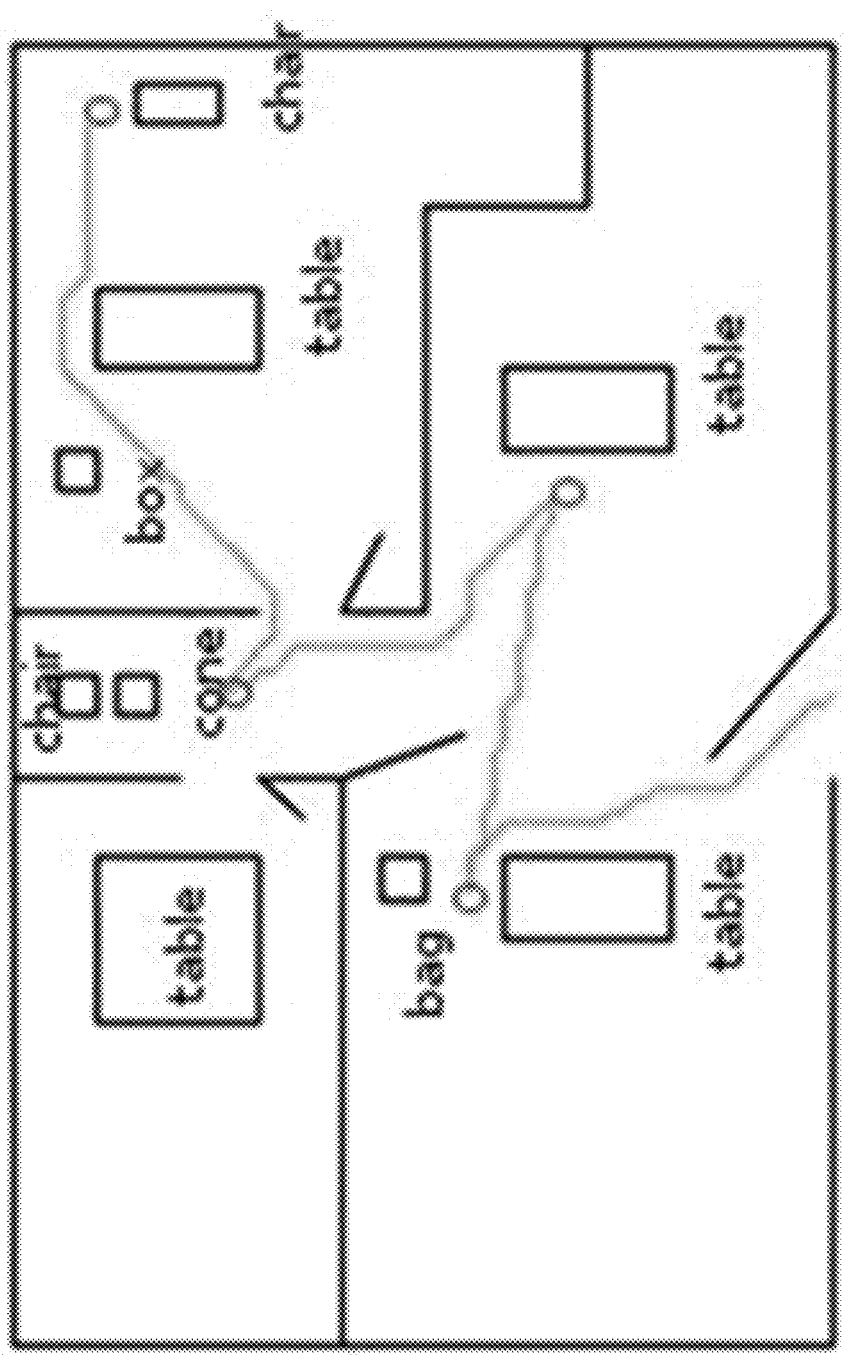
FIG. 15 is a diagram illustrating a pathfinding process according to various aspects.
Figure 16A:
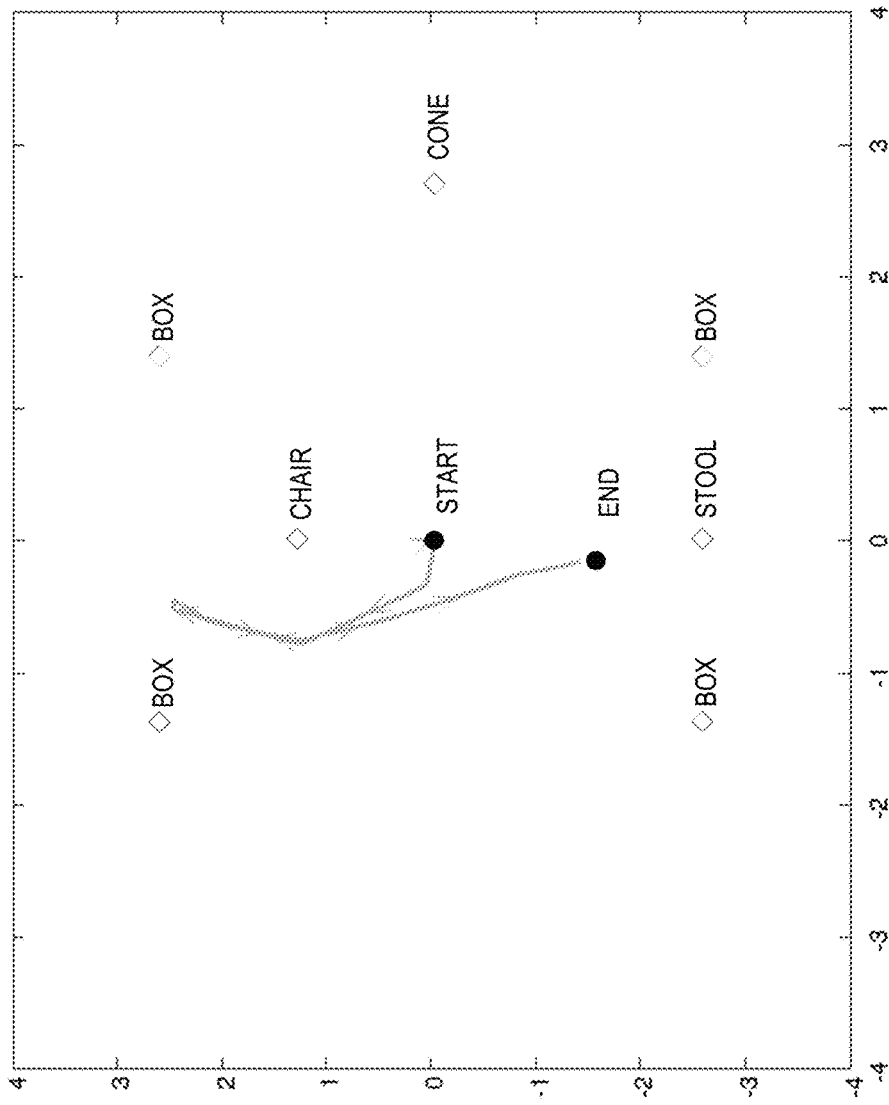
FIG. 16A is a plot illustrating a generated path from a first input sentence.
Figure 16B:
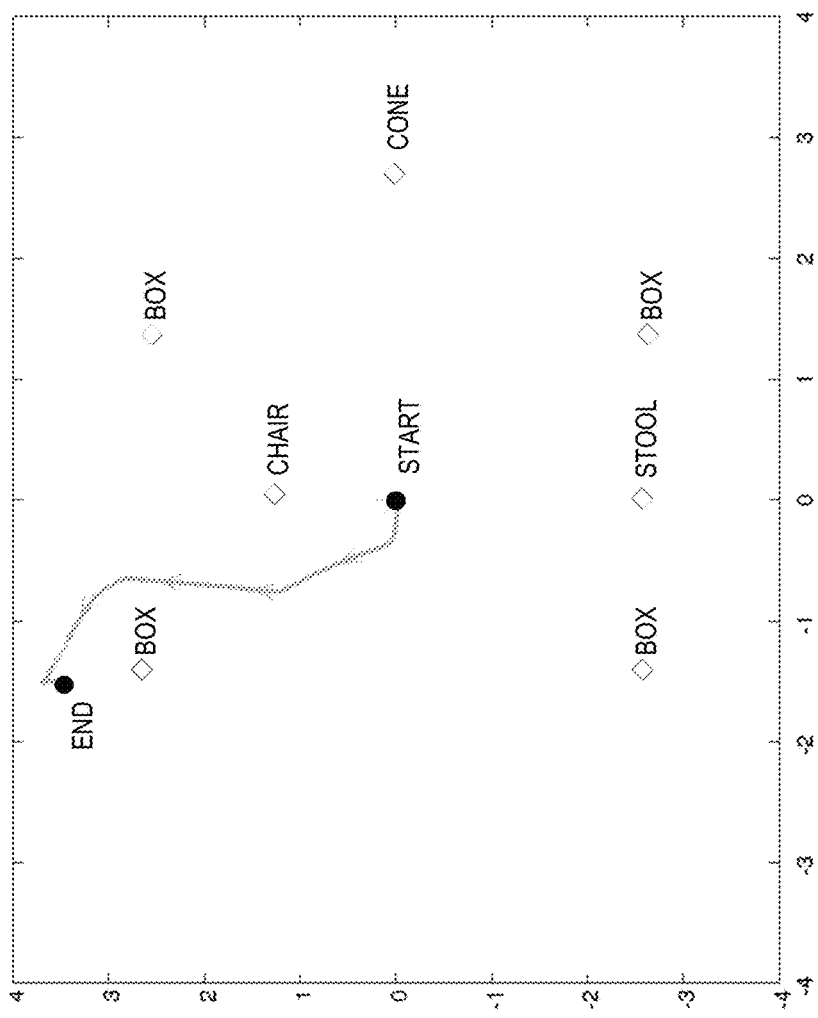
FIG. 16B is a plot illustrating a generated path from a second input sentence.
Figure 16C:
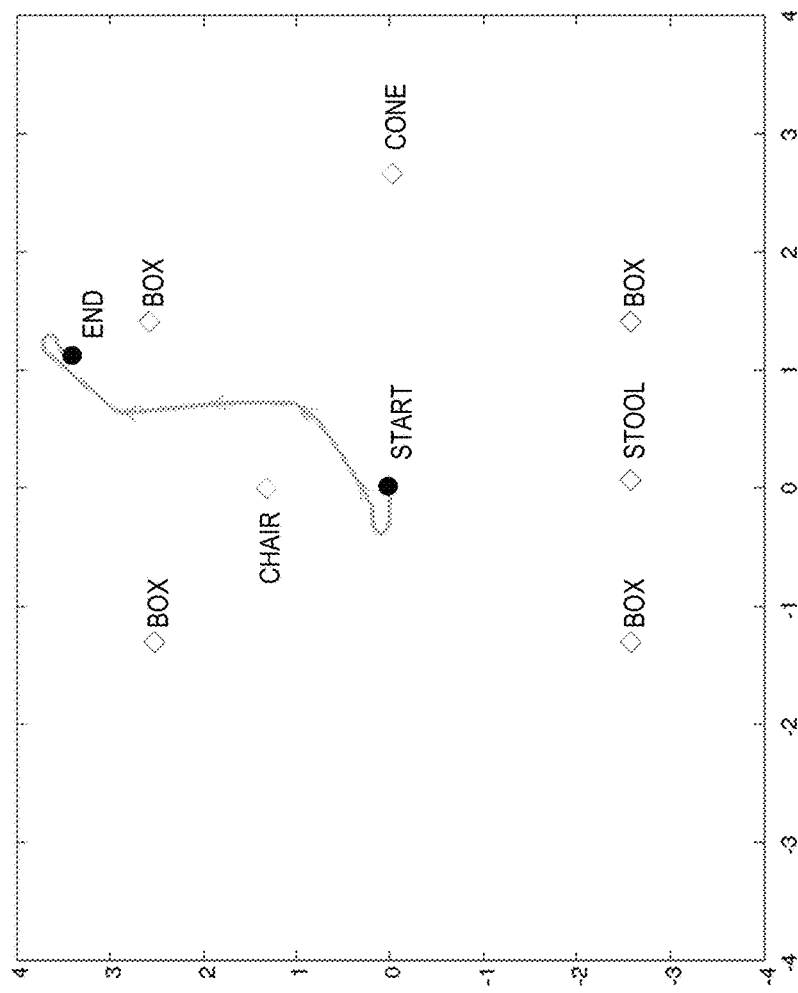
FIG. 16C is a plot illustrating a generated path from a third input sentence.

The prepositions selected for the waypoints, together with the unique noun phrases describing the corresponding reference objects of the selected prepositions, are then assembled into a sentence as illustrated in FIG. 13 ("The robot went right of the table which is left of the chair, then went in front of the chair, then went behind the table which is right of the chair").

Generation may be applied to paths obtained by odometry during human teleoperation of the robot. In one example, such paths are sampled at approximately 50 Hz, although a higher or lower sampling frequency may be used, such as within a range of 45-55 Hz. Because of the high sampling frequency, these paths have many redundant waypoints that provide little information to the generation process. Thus, as a preprocessing step, the system 100 downsamples the path by computing the integral distance from the beginning of the path to each waypoint on the path and selecting waypoints at increments (for example, every 5 cm, or every 2-20 cm) along the integral length.

To perform the comprehension task 214, the system 100 uses gradient ascent found in equation (3), where R(s, p, f, Λ) is the product of the graphical model likelihoods $\psi_t(\rho_1|m, f, \Lambda)$ from (4) constructed from the temporal segments of the sentence s. The unknown path p^ is constructed to contain one path variable $p_t$ for each temporal segment t in the sentence, whose locations are optimized to maximize the scoring function, and thus find waypoints that maximize the degree to which the semantics of the sentence are satisfied. This differs from pathfinding algorithms in general, where an initial point and goal point are given, and the algorithm must find dense intermediate points which avoid obstacles. Rather, the comprehension procedure determines the sparse (sequence of) goal point(s) that satisfy a sentence. Thus, the output of the sentence comprehension algorithm can be used as the input to any pathfinding algorithm when obstacle avoidance is needed. FIG. 12 shows an example of using the D* algorithm to perform pathfinding in a more complex environment with walls, doorways, and differently shaped obstacles.

The system 100 uses the optimization in equation (3) to find a sparse set of waypoints that are eventually input to pathfinding. It computes a MAP estimate of the product of the likelihoods of the graphical models associated with the sentence s. As stated, these graphical models represent the semantics of the sentence, but do not take into account constraints of the world, such as the need to avoid collision with the objects in the floorplan. Further, the scoring function as stated can be difficult to optimize because the velocity angle computed between two waypoints becomes increasingly sensitive to small changes in their positions as they become close together. To remedy the problems of the waypoints getting too close to objects and to each other, additional factors are added to the graphical models in certain embodiments. A barrier penalty B(r) may be added between each pair of a waypoint and floorplan object as well as between pairs of temporally adjacent waypoints to prevent them from becoming too close. The system uses the formula $$B(r) = \text{SMOOTHMAX}\left(1, 1 + \frac{2r_1 + r_2}{r}\right)^{-1}$$

where r is the distance either between a waypoint and an object or between two waypoints, and where $r_1$ and $r_2$ are the radii of the two things being kept apart, either the vehicle or an object. This barrier is approximately 1 until the distance between the two waypoints becomes small, at which point it decreases rapidly, pushing them away from each other by approximately the vehicle radius. For the penalty between the waypoints and objects, meant to prevent collision, both the vehicle radius and object radii are assumed to be 40 cm in this example. For the penalty between temporally adjacent waypoints, meant to ease the optimization problem, $r_1$ and $r_2$ are set to 10 cm. Finally, because our formulation of the semantics of prepositions is based on angles but not distance, there is a large subspace of the floor that leads to equal probability of satisfying each graphical-model factor. This allows a path to satisfy a prepositional phrase like "to the left of the chair" while being very far away from the chair, which, while technically correct, can result in paths which appear to a human to be infelicitous. To remedy this, the system 100 may encode a slight preference for shorter distances by adding a small attraction $A(r) = \exp(-(r/100))$ between each waypoint and the floorplan objects selected as its reference objects, where r is the distance between the waypoint and the target object of a preposition. The score optimized is the product of the graphical-model factors for each waypoint along with the barrier and attraction terms. An example of the scoring function corresponding to the example phrase "toward the chair which is left of the bag," together with the additional terms, is shown in FIG. 13. Its gradient with respect to the waypoint locations is computed with automatic differentiation. The sequence of waypoints maximizing this product is then found with gradient ascent. The individual points cannot be optimized independently because each graphical model score depends on the velocity, and thus the previous point. They must be optimized jointly. Rather than initializing this joint optimization randomly, which we found in practice frequently resulted in the optimizer getting stuck in poor solutions, we use a multistep initialization procedure conceptually similar to layer-by-layer training in neural net-works such as in. The score is optimized repeatedly with subsets of the waypoints increasing in size. Beginning with the temporally first and ending with the last, waypoints are added sequentially, each time intitializing the newly added point 10 cm (or other appropriate increment distance) from the last point in the previously optimized subset. Then, the product of scores corresponding to the current set of points is optimized. In the final stage of optimization, all points have been added, and the entirety of the score is optimized.

The output of the comprehension algorithm is a sparse set of waypoints corresponding to the temporal segments of the input sentence(s). To use these waypoints to actually drive a robot, it is necessary to perform pathfinding between them as a postprocessing step because while the barrier penalties do prevent the waypoints from being chosen close to objects, they do not prevent the paths between them from doing SO.

Any path-finding algorithm with sufficient power to handle the floorplan will suffice. In testing examples, a simple procedure was used that recursively adds an additional waypoint to each path segment (the line segment between two goal waypoints) that passes through an obstacle. The new point is offset so that the two new path segments do not pass through the obstacle. This process is repeated recursively on new path segments until no segment passes through an obstacle.

In certain embodiments, the floorplans 206 (with object locations and abstract labels) can be generated using a process that receives sensor input and video images from a mobile vehicle in the environment. This process is referred to herein as object codetection and comprises four main steps: object detection, object localization, object clustering and object labeling.

Detection and localization of objects are performed by the system 100 by generating a large number of candidate object proposal boxes in each video frame, using projective geometry to locate such in the world, and solving for the most consistent sets of proposal boxes by performing inference on a graphical model. The proposals are generated by applying an object proposal mechanism to each video frame. This uses general-purpose visual cues such as edges, within-region similarity, and closed contours to place bounding boxes around candidate objects. No class-specific object detectors are used. These proposals therefore support detection of previously unseen objects.

The video feed from the vehicle camera 180 is time stamped and therefore synchronized with localization data from odometry and the IMU, each video frame is associated with the camera location in the world coordinate frame. This information is used to determine, via projective geometry, the world location of each box under the assumption that it rest on the ground. The world location ($w_x$, $w_y$, $w_z$) and world width $w_w$ of an object proposal are thus determined for each box.

However, the proposal-generation mechanism is typically highly inaccurate; it often produces both false positives and false negatives. To compensate for this, the system 100 biases the proposal-generation mechanism to overgenerate, producing ten proposals per frame in attempt to reduce false negatives at the expense of false positives, which are filtered out by performing inference on a graphical model.

For each video, the system 100 constructs a graphical model with a vertex for each frame that ranges over a set of labels that denote the proposals generated for that frame. Each possible assignment of a vertex to a proposal box has a corresponding unary score which represents the likelihood that the image contained within that box depicts an object. There is also a binary score for each pair of vertex assignments which represents how consistent that pair of assignments is. These binary scores take into account both the image similarity between the two boxes and other geometric information available through knowledge of the vehicle's trajectory. Solving this graphical model produces an assignment from vertices to labels which selects a single proposal as depicting the most prominent object in that frame. Because there is not always an object visible to the robot, the system 100 augments the potential label set of each vertex to include a dummy proposal that indicates that no object is prominent in the field of view.

Figure 17:
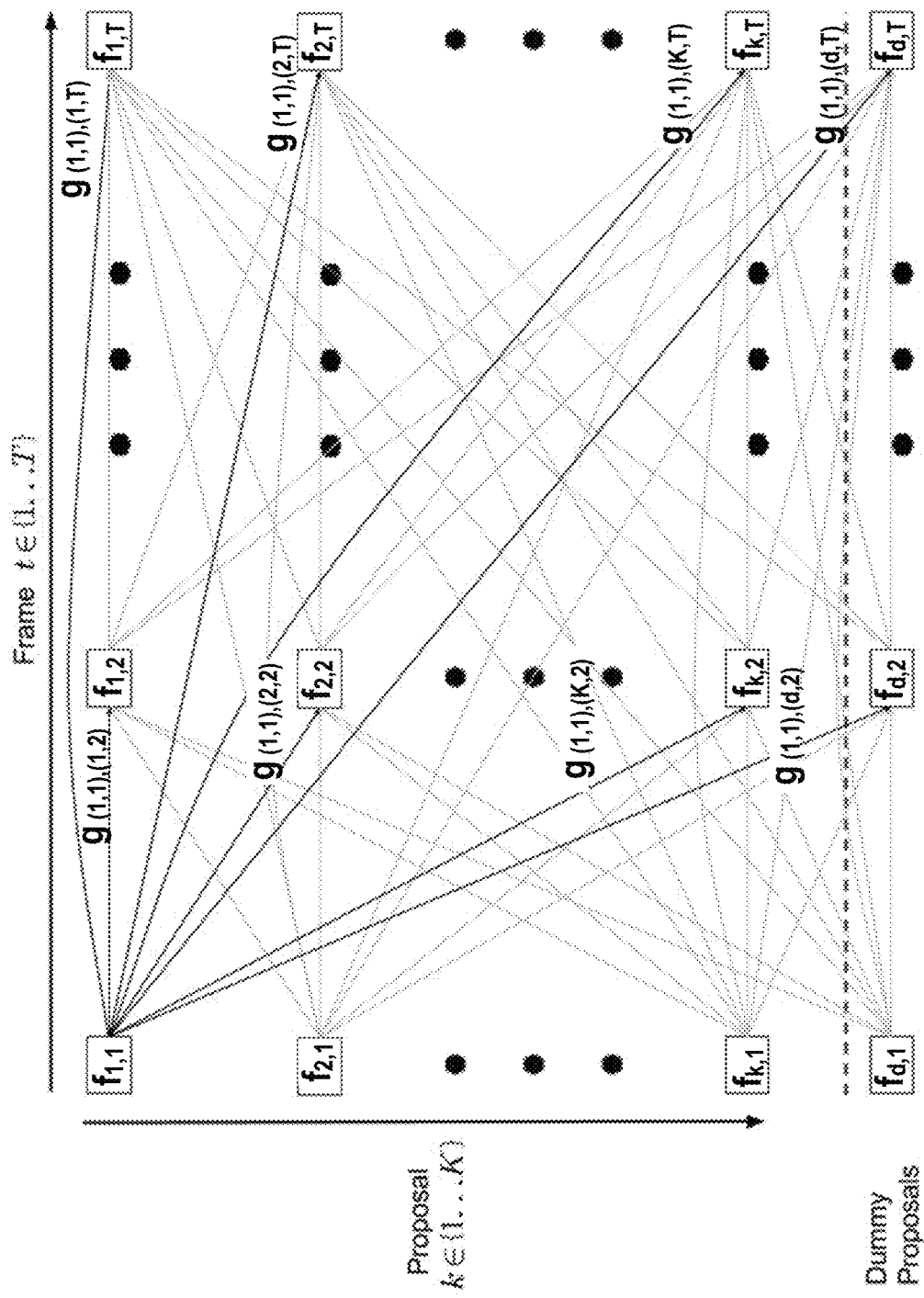
FIG. 17 is a diagram showing a visualization of a graphical model framework for proposal selection according to various aspects.
Figure 18A:
FIG. 18A-F are images showing solutions to the graphical model of FIG. 17 used to select prominent objects from the proposals. The left column shows correct results, while the right column shows failure modes.
Figure 18B:
Figure 18C:
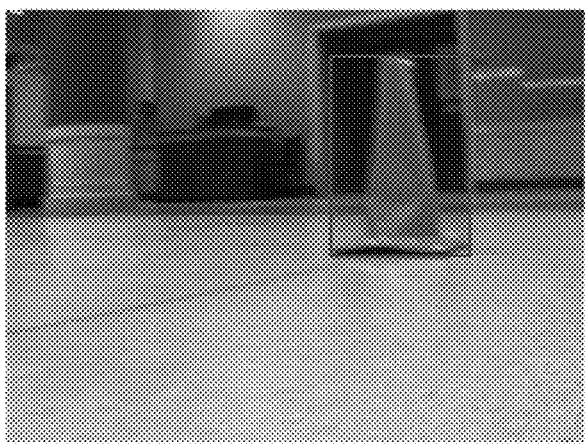
Figure 18D:
Figure 18E:
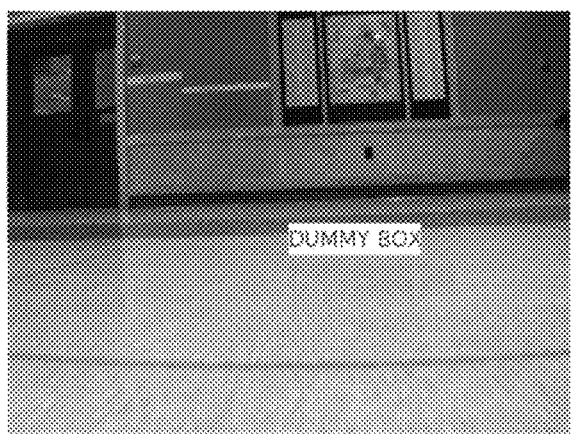
Figure 18F:
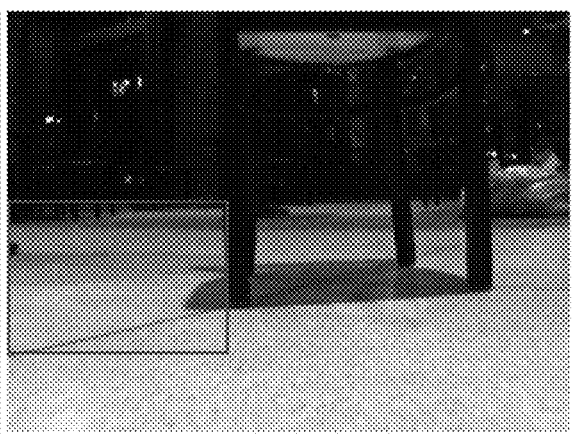

The graphical model optimizes the score $$\max_{v_1 \in L_1} \cdots \max_{v_T \in L_T} \prod_{i<j} f_{v_i} g_{v_i, v_j} \quad (5)$$

a where i and j denote frames from a video feed of T frames, $v_i$ denotes the vertex constructed for frame i, and $L_i$ denotes the set of proposals generated for frame i. Also, $f_l$ denotes the unary factor for proposal l, and $g_{k,l}$ denotes the binary factor for a pair of proposals k and l, where k and/are particular proposals. This graphical model is fully connected, as shown in FIG. 17, because instead of trying to enforce temporal coherence, which might be impossible when using independent object proposals, the system 100 instead seeks to maximize similarity between all non-dummy proposals. The hypothetical optimum for this is a single cluster of proposals in one location. However, in the absence of such, our graphical model will choose as small a number of cliques as possible, each with as many frames as possible, with dummy boxes in those frames that do not fit sufficiently well into any clique. The system 100 determines the highest scoring set of vertex assignments through belief propagation. The unary factors f are obtained through the proposal-generation mechanism, which associates a proposal score b with each proposal. In practice, however, b is not a reliable indicator. Since the system overgenerates proposals, it may get many proposals that do not depict valid objects. Thus the system uses additional problem-specific assumptions and information to filter the proposal boxes.

Because the proposal mechanism treats the borders of the image frame as edges, it tends to give high score to boxes whose borders coincide with the image boundaries; the system filters such boxes. Boxes whose bottom is above the horizon line of the image cannot be located on the ground, violating an assumption of the problem. Thus the system filters such boxes. In one test example, due to the size of the vehicle and the experimental area, the system assumes that all objects to be detected will be less than 2 meters wide, so the system filters proposal boxes that are wider than 2 m. The system finally filters proposals that reside outside of the floor plan boundaries.

The similarity measure between pairs of proposals k and l in different frames used as the binary factors g in the graphical model are an average of three terms $s_{k,l}$, $d_{k,l}$, and $w_{k,l}$ that denote different aspects of similarity.

$$g_{k,l} = \frac{1}{3}(s_{k,l} + d_{k,l} + w_{k,l}) \tag{6}$$

The first similarity measure, $S_{k,l}$, encodes visual similarity. It is the normalized $x^2$ distance between PHOW dense SIFT descriptors, for the image inside each proposal in each frame. The second similarity measure, $d_{k,l}$, encodes the Euclidean distance between the world coordinates of two proposed objects, reflecting the constraint that an object should have the same position in the world, even when viewed from different viewpoints. The final similarity measure, $w_{k,l}$, encodes the difference in the world width of two proposals, reflecting the constraint that an object should be of similar size when detected from different viewpoints The system normalizes $d_{k,l}$ and $w_{k,l}$ to [0 1], in order to match them to the scale of the $x^2$ distance, by passing them through a zero-mean Gaussian membership function.

Some visualizations of these results are shown in FIGS. 18A-F. All images are taken from navigational paths driven on the same floor plan. These results show that both false positives (FIG. 18F) as well as false negatives (FIG. 18B, FIG. 18D) can arise. However, our overall goal is to determine the collection of objects present in each floor plan, their world positions, and a unique labeling. For this, it is not necessary to have correct detections of prominent objects in every frame of the video feed. Subsequent processing is resilient to such false positives and negatives.

After using the graphical model to find the most prominent objects in each video frame and localizing such in the world, the next step is to cluster these sets of detections in order to find the object locations in each floorplan. To determine the cluster centers within a floorplan, the system 100 assumes that the proposals were drawn from a probability distribution with mass centered around the actual world objects. This density is estimated and the peaks in this distribution are taken to be object locations. In one example, a Gaussian kernel density estimator $S_{x,y}$ is used, with samples weighted by their proposal score and by a visibility measure $v_n$.

$$S_{x,y} = \sum_{n=1}^{N}\left(f_n \frac{\frac{1}{\sqrt{2\pi}}\exp\frac{\|(x,y)-(x_n,y_n)\|}{2}}{v_n}\right) \tag{7}$$

$S_{x,y}$ is computed for each point (x, y) in each floor plan, where n ranges over all nondummy selected proposals, ($x_n$, $Y_n$) denotes the world location of proposal n, $f_n$ denotes the unary factor of proposal n, and $v_n$ denotes a visibility measure of proposal n.

The visibility measure Un is taken as the number of times the world location ($x_n$, $Y_n$) was in the camera's field of view. This encodes the idea that when an object truly exists at world location (x, y), it should be detected a high fraction of the time that (x, y) is within the robot's field of view, and eliminates bias in the estimation caused by viewing some regions of the world more often than others.

The object locations must next be labeled in a consistent fashion. These labels are intended to be used as input to the learning method described above (FIG. 2), which learns an assignment from abstract object labels to nouns. That method can handle a many-to-one mapping of labels to nouns. As such, while it is important that the labels produced are consistent, and do not assign the same abstract labels to world objects of differing class, it is not critical that a single abstract label be used to represent each class of objects. For example, it is perfectly acceptable for two abstract labels to be used to represent different kinds of bags, but would be problematic for a single label to be used to represent both bags and tables.

To assign class labels to each detected object location, the system 100 first assigns each selected proposal box and its corresponding image region to the closest object location (peak) determined in the previous step, rejecting outliers based on a distance threshold. The system then creates a similarity matrix Q between pairs $p_1$, $p_2$ of object peaks detected in all floor plans. If the system has detected P object peaks, each with a set $C_p$ of associated image regions, let $U_{a,b}$ denote the visual similarity between pairs a, b of image regions where a is associated with peak $p_1$ and b is associated with peak $p_2$. Visual similarity is measured by the same methods as s in (6). However, in certain embodiments, the system takes the mean of only the similarity scores above a predetermined threshold (e.g., the top 50% of similarity scores) in an effort to suppress noise from incorrectly-associated images. We compute Q as $$Q_{p_1,p_2} = \frac{\sum_{a \in C_{p_1}} \max_{b \in C_{p_2}} U_{a,b} + \sum_{b \in C_{p_2}} \max_{a \in C_{p_1}} U_{a,b}}{|C_{p_1}| + |C_{p_1}|} \tag{8}$$

The system then formulates a second graphical model with a vertex for each of the P object peak locations to compute a common labeling across all floor plans. The vertex variables can range over the set of abstract class labels. Since abstract class labels are interchangeable, there are no unary factors in this graphical model. The binary factors represent visual similarity between the sets of images assigned to each object location. Let '(p) represent the abstract class label selected for object p ∈ P={1, ..., P}. The system then seeks the set of labels that maximizes the sum of all t scores:

$$\max_{\ell} \sum_{\substack{p_1, p_2 \in P \\ p_1 \neq p_2}} t(p_1, p_2)$$

We assign a factor t ($p_1$, $p_2$) for each pair of $p_1$, $p_2$ ∈ P, $p_1 \neq p_2$, computed as follows:

$$t(p_1, p_2) = \begin{cases} -\log(Q_{p_1, p_2}) & \text{if } \ell(p_1) = \ell(p_2) \\ -\log(1 - Q_{p_1, p_2}) & \text{if } \ell(p_1) \neq \ell(p_2) \end{cases}.$$

Belief propagation may fail to solve this graphical model, and so the system may use branch and bound as an alternative.

Processor 186 can implement processes of various aspects described herein. Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 120, user interface system 130, and data storage system 140 are shown separately from the data processing system 186 but can be stored completely or partially within the data processing system 186.

The user interface system 130 can include a mouse, a keyboard, another computer (connected, e.g., via a network or a null-modem cable), or any device or combination of devices from which data is input to the processor 186. The user interface system 130 also can include a display device, a processor-accessible memory, or any device or combination of devices to which data is output by the processor 186. The user interface system 130 and the data storage system 140 can share a processor-accessible memory.

In various aspects, processor 186 includes or is connected to communication interface 115 that is coupled via network link 116 (shown in phantom) to network 150. For example, communication interface 115 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 115 sends and receives electrical, electromagnetic or optical signals that carry digital or analog data streams representing various types of information across network link 116 to network 150. Network link 116 can be connected to network 150 via a switch, gateway, hub, router, or other networking device.

Processor 186 can send messages and receive data, including program code, through network 150, network link 116 and communication interface 115. For example, a server can store requested code for an application program (e.g., a JAVA applet) on a tangible non-volatile computer-readable storage medium to which it is connected. The server can retrieve the code from the medium and transmit it through network 150 to communication interface 115. The received code can be executed by processor 186 as it is received, or stored in data storage system 140 for later execution.

Data storage system 140 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 120), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 140 can be a tangible non-transitory computer-readable storage medium, i.e., a non-transitory device or article of manufacture that participates in storing instructions that can be provided to processor 186 for execution.

In an example, data storage system 140 includes code memory 141, e.g., a RAM, and disk 143, e.g., a tangible computer-readable rotational storage device such as a hard drive. Computer program instructions are read into code memory 141 from disk 143. Processor 186 then executes one or more sequences of the computer program instructions loaded into code memory 141, as a result performing process steps described herein. In this way, processor 186 carries out a computer implemented process. For example, steps of methods described herein, blocks of the flowchart illustrations or block diagrams herein, and combinations of those, can be implemented by computer program instructions. Code memory 141 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 186 (and possibly also other processors), to cause functions, acts, or operational steps of various aspects herein to be performed by the processor 186 (or other processor). Computer program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method for directing motion of a vehicle, comprising:
receiving commands in natural language using a processor, the commands specifying a relative path to be taken by the vehicle with respect to other objects in an environment;
determining an absolute path for the vehicle to follow based on the relative path using the processor, the absolute path comprising a series of coordinates in the environment; and
directing the vehicle along the absolute path,
wherein a degree to which the absolute path taken by the vehicle satisfies performance of the commands is specified by a scoring function,
wherein a score representing a meaning of the commands is formed from scores representing meanings of individual words in the commands,
wherein hidden Markov models are used to represent a sequence of portions of vehicle paths corresponding to phrases in the commands.

2. The method of claim 1 wherein at least one of the commands contains prepositions to specify the vehicle motion.

3. The method of claim 1 wherein the scoring function is used to learn representations of the meanings of the words used in the commands.

4. The method of claim 1 wherein the scoring function is used to produce natural language descriptions of paths taken by the vehicle.

5. The method of claim 1 wherein the score is augmented with barrier penalties to prevent the vehicle from colliding with objects in the environment.

6. The method of claim 1 wherein the score is augmented with barrier penalties to smooth the path taken by the vehicle.

7. The method of claim 1 wherein the absolute path to be taken by the vehicle to satisfy the commands is determined based on a high score from the scoring function.

8. The method of claim 7 wherein optimization is performed using gradient ascent.

9. A method for directing motion of a vehicle, comprising:
receiving commands in natural language using a processor, the commands specifying a relative path to be taken by the vehicle with respect to other objects in an environment; and
determining an absolute path for the vehicle to follow based on the relative path using the processor, the absolute path comprising a series of coordinates in the environment; and
directing the vehicle along said absolute path,
wherein objects in the environment re disambiguated by specifying their position relative to other objects using prepositions,
wherein hidden Markov models are used to represent a sequence of portions of the absolute vehicle path corresponding to phrases in the commands.

10. The method of claim 9 wherein a degree to which the absolute path taken by the vehicle satisfies at least one of the commands is specified by a scoring function.

11. The method of claim 10 wherein the scoring function is used to learn representations of a meaning of at least one of the words used in the commands.

12. The method of claim 10 wherein the scoring function is used to produce a natural language description of the absolute path taken by the vehicle.

13. The method of claim 10 wherein the absolute path to be taken by the vehicle to satisfy the commands is determined based on a high score from the scoring function.

14. The method of claim 13 wherein optimization is performed using gradient-based methods.

15. The method of claim 10 wherein a score representing a meaning of the commands is formed from scores representing meanings of individual words in the commands.

16. The method of claim 15 wherein the score is augmented with barrier penalties to prevent the vehicle from colliding with objects in the environment.

17. The method of claim 15 wherein the score is augmented with barrier penalties to smooth the absolute path taken by the vehicle.

18. A method for directing motion of a vehicle, comprising:
receiving commands in natural language using a processor, the commands specifying a relative path to be taken by the vehicle with respect to other objects in an environment; and
determining an absolute path for the vehicle to follow based on the relative path using the processor, the absolute path comprising a series of coordinates in the environment; and
directing the vehicle along said absolute path,
wherein objects in the environment re disambiguated by specifying their position relative to other objects using prepositions,
wherein meanings of motion prepositions are specified as scores over a direction of motion of the vehicle relative to a reference object in the environment.

19. A method for directing motion of a vehicle, comprising:
receiving commands in natural language using a processor, the commands specifying a relative path to be taken by the vehicle with respect to other objects in an environment; and
determining an absolute path for the vehicle to follow based on the relative path using the processor, the absolute path comprising a series of coordinates in the environment; and directing the vehicle along said absolute path,
wherein objects in the environment re disambiguated by specifying their position relative to other objects using prepositions,
wherein meanings of position prepositions are specified as scores over a position of a target object in the environment relative to a reference object in the environment.

* * * * *